United States Patent
Hayashi et al.

(10) Patent No.: US 7,801,550 B2
(45) Date of Patent: Sep. 21, 2010

(54) RADIO COMMUNICATION SYSTEM AND METHOD WHERE A RADIO TERMINAL TRANSMITS UPLINK USER DATA TO A BASE STATION THROUGH AN ENHANCED DETICATED PHYSICAL DATA CHANNEL

(75) Inventors: Takahiro Hayashi, Yokosuka (JP); Akihito Hanaki, Yokohama (JP); Junichiro Kawamoto, Tokyo (JP); Yoshikazu Goto, Yokohama (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/365,188

(22) Filed: Feb. 4, 2009

(65) Prior Publication Data
US 2009/0201856 A1    Aug. 13, 2009

(30) Foreign Application Priority Data
Feb. 7, 2008    (JP)    ............... 2008-027825

(51) Int. Cl.
H04W 84/02    (2009.01)
H04B 7/005    (2006.01)
(52) U.S. Cl. ...................... 455/522; 370/328
(58) Field of Classification Search .......... 455/522; 370/328
See application file for complete search history.

(56) References Cited
U.S. PATENT DOCUMENTS
2007/0298825 A1 *  12/2007  Kayama et al. ............. 455/522
2008/0032725 A1     2/2008  Usuda et al.
2009/0201856 A1 *   8/2009  Hayashi et al. ............. 370/328

FOREIGN PATENT DOCUMENTS
WO    2005/125259 A1    12/2005
WO    2007/133136 A1    11/2007

OTHER PUBLICATIONS

3GPP TS 25.321 V7.5.0 (Jun. 2007). 3rd Generation Partnership Project; Technical Specification Group Radio Access Network; Medium Access Control (MAC) protocol specification (Release 7), 141 pages.
3GPP TS 25.212 V7.5.0 (May 2007), 3rd Generation Partnership Project; Technical Specification Group Radio Access Network; Multiplexing and channel coding (FDD) (Release 7), 103 pages.

(Continued)

Primary Examiner—William D Cumming
(74) Attorney, Agent, or Firm—Marvin A. Motsenbocker; MOTS Law, PLLC

(57) ABSTRACT

A base station includes a first selecting unit that selects a reduction target terminal, a first calculating unit that calculates a reduction amount of assigned transmission rate assigned to the reduction target terminal, a second selecting unit that selects an increase target terminal, a second calculating unit that calculates an increase amount of the assigned transmission rate assigned to the increase target terminal, and a transmitting unit that transmits transmission rate control date to a radio terminal. The second selecting unit selects the increase target terminal and the second calculating unit calculates the increase amount when the reduction target terminal is not selected by the first selecting unit.

13 Claims, 11 Drawing Sheets

OTHER PUBLICATIONS

3GPP TS 25.309 V6.6.0 (Mar. 2006), 3rd Generation Partnership Project; Technical Specification Group Radio Access Network; FDD Enhanced Uplink; Overall description; Stage 2, (Release 6), 34 pages.

3GPP TS 25.427 V7.5.0 (Sep. 2007), 3rd Generation Partnership Project; Technical Specification Group Radio Access Network; UTRAN lub/lur interface user plane protocol for DCH data streams (Release 7), 44 pages.

Lee J A et al.: "A rate control algorithm for uplink high-speed packets data transmission in UMTS" Signal Processing Advances in Wireless Communications, 2005 IEEE 6th Workshop on New York, NY, USA, Jun. 2-8, 2005, Piscatway, NJ, USA, IEEE, Jun. 2, 2005, pp. 730-734, XP0108346223.

Liu Y et al.: "Integrated Radio Resource Allocation for Multihop Cellular Networks with Fixed Relay Stations" IEEE Jounal on Selected Areas in Communications, IEEE Service Center, Piscataway, NJ, USA, vol. 24, No. 11, Nov. 1, 2006, pp. 2137-2146, XP011142612.

* cited by examiner

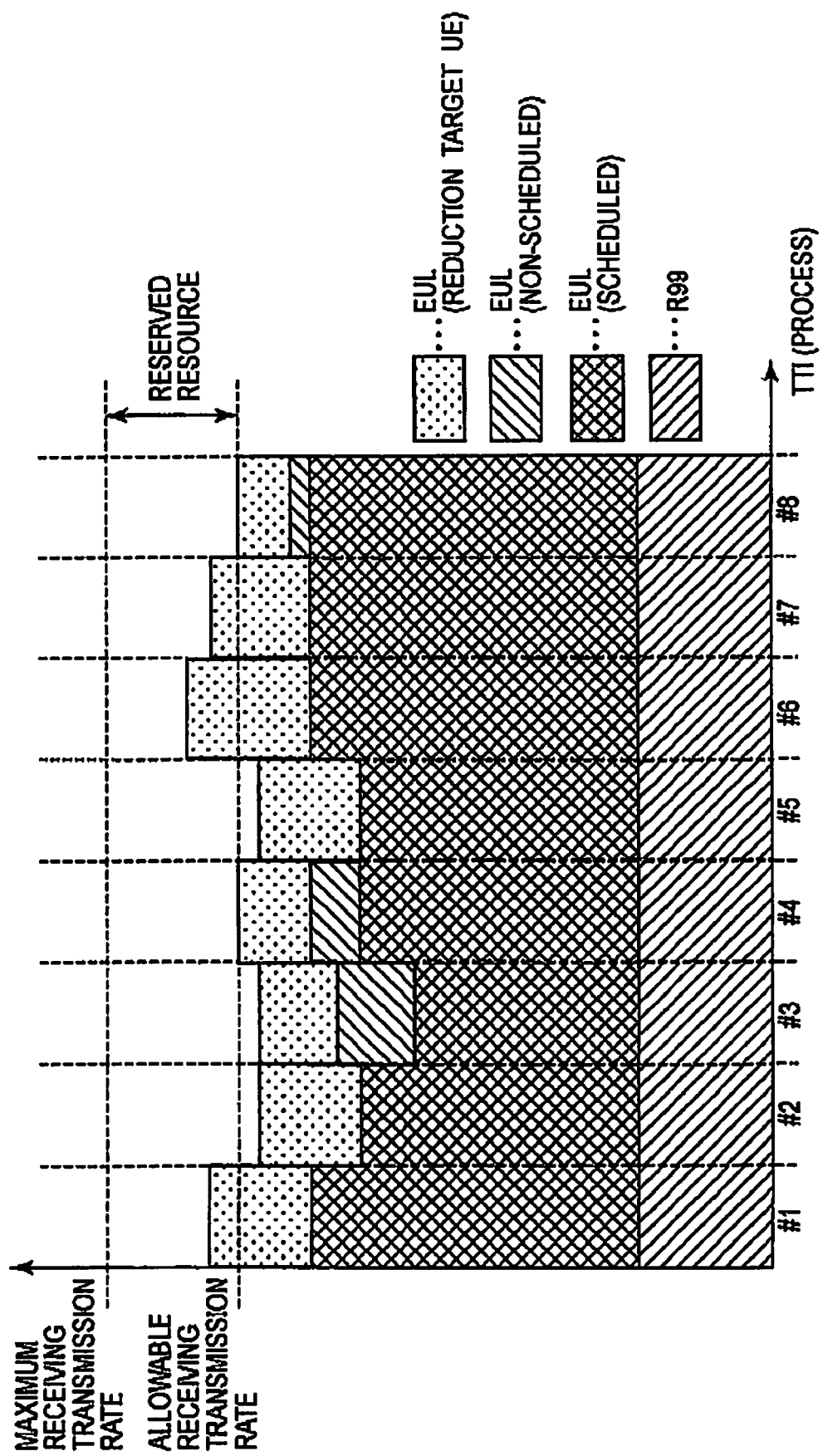

RADIO COMMUNICATION SYSTEM AND METHOD WHERE A RADIO TERMINAL TRANSMITS UPLINK USER DATA TO A BASE STATION THROUGH AN ENHANCED DETICATED PHYSICAL DATA CHANNEL

CROSS REFERENCE TO RELATED APPLICATION

This application is based upon and claims the benefit of priority from prior Japanese Patent Application No. 2008-027825, filed on Feb. 7, 2008; the entire contents of which are incorporated herein by reference.

BACKGROUND OF THE INVENTION

1. Field of the Invention

The present invention relates to a radio communication system in which a radio terminal transmits uplink user data to a base station through an enhanced dedicated physical data channel and the base station transmits, to the radio terminal, transmission rate control data for controlling a transmission rate of the uplink user data, and also relates to a radio communication method and a base station.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as Release 99 (R99) and others.

For the purpose of improving the throughput and shortening the delay time, and others, there has recently been proposed a technique in which a base station assigns the radio resources for uplink user date transmitted from each of the radio terminals to the base station (network side). Note that such a technique (hereinafter referred to as a second technique) is sometimes referred to as the High Speed Uplink Packet Access (HSUPA), the Enhanced Uplink (EUL) and others.

Each of the cells functions as a serving cell or as a non-serving cell. A Transport Block Size (TBS) is determined based on the transmission rate (for example, a Scheduling Grant (SG)) of the uplink user data, and is controlled by transmission rate control data transmitted from the serving cell and the non-serving cell. The transmission rate control data includes Absolute Grant (AG) for directly indicating the transmission rate and Relative Grant (RG) for relatively indicating the transmission rate (for example, see 3GPP TS25.321 Ver. 7.5.0).

Here, the uplink user data is transmitted to the base station from the radio terminals through an Enhanced Dedicated Physical Data Channel (E-DPDCH). The absolute transmission rate control data (AG) is transmitted from the radio base station to the radio terminals through an E-DCH Absolute Grant Channel (E-AGCH). The relative transmission rate control data (RG) is transmitted from the radio base station to the radio terminals through an E-DCH Relative Grant Channel (E-RGCH).

The serving cell transmits the absolute transmission rate control data (AG) and the relative transmission rate control data (RG) to the radio terminals. Meanwhile, the non-serving cell transmits, to the radio terminals, only the relative transmission rate control data (RG) without transmitting the absolute transmission rate control data (AG).

Meanwhile, the base station has the upper limit of the radio resource (maximum radio resource) assignable to the radio terminal. Here, the maximum radio resource is a total of transmission rates assignable to the radio terminal by the base station (maximum receiving transmission rate).

In the above-described second technique, the base station can transmit the absolute transmission rate control data (AG) or the relative transmission rate control data (RG) at each TTI (Transmission Time interval). In other words, the transmission rate assigned to the radio terminal is variable at each TTI.

Moreover, the base station can increase the transmission rate assigned to the radio terminal according to the buffer amount (TEBS) indicating an amount of the uplink user data accumulated in a buffer provided in the radio terminal.

For example, the base station increases the transmission rate assigned to the radio terminal by the transmission of the absolute transmission rate control data (AG) or the relative transmission rate control data (RG) when the buffer amount is large.

However, in the above-described second technique, the base station merely controls the transmission rate assigned to the radio terminal according to the buffer amount.

Therefore, it can be considered as a case in which not all of the radio resource (maximum receiving transmission rate) of the base station is assigned to the radio terminal. Moreover, it can be considered as a case in which the maximum radio resource (maximum receiving transmission rate) of the base station is not properly assigned to the radio terminal.

SUMMARY OF THE INVENTION

A first aspect of the present invention is summarized as a radio communication system in which a radio terminal transmits uplink user data to a base station through an enhanced dedicated physical data channel and the base station transmits, to the radio terminal, transmission rate control data for controlling a transmission rate of the uplink user data. The base station includes: a first selecting unit configured to select as a reduction target terminal the radio terminal of which an assigned transmission rate is to be reduced, where the assigned transmission rate is the transmission rate that the base station has already assigned to the radio terminal; a first calculating unit configured to calculate a reduction amount of the assigned transmission rate assigned to the reduction target terminal selected by the first selecting unit a second selecting unit configured to select as an increase target terminal the radio terminal of which the assigned transmission rate is to be increased; a second calculating unit configured to calculate an increase amount of the assigned transmission rate assigned to the increase target terminal selected by the second selecting unit; and a transmitting unit configured to transmit, to the reduction target terminal, the transmission rate control data indicating the transmission rate after the assigned transmission rate is reduced by the reduction amount, and that transmit, to the increase target terminal, the transmission rate control data indicating the transmission rate after the assigned transmission rate is increased by the increase amount. The second selecting unit selects the increase target terminal when the reduction target terminal is not selected by the first selecting unit. The second calculating unit calculates the increase amount not to exceed an allowable receiving transmission rate, when the reduction target terminal is not selected by the first selecting unit. The allowable receiving transmission rate is equal to or lower than a maximum receiving transmission rate assignable by the base station.

In the first aspect of the present invention, the radio terminal includes a terminal side transmitting unit configured to transmit information indicating a buffer amount to the base station, where the buffer amount is an uplink user data amount accumulated in a transmission buffer provided in the radio terminal. The first selecting unit selects as the reduction target terminal the radio terminal of which the buffer amount is smaller than a predetermined threshold.

In the first aspect of the present invention, the radio terminal includes a terminal side transmitting unit configured to transmit happiness information to the base station, the happiness information indicating whether or not the transmission rate assigned to the radio terminal is sufficient. The first selecting unit selects as the reduction target terminal, the radio thermal that transmits the happiness information indicating the assigned transmission rate is sufficient, with a ratio higher than a predetermined threshold.

In the first aspect of the present invention, the transmission rate is determined by a transmission power ratio of the enhanced dedicated physical data channel to transmission power of a dedicated physical control channel. The radio terminal includes a terminal side transmitting unit configured to transmit information indicating the transmission power ratio to the base station, where the transmission power ratio is a ratio of maximum transmission power allowed to the radio terminal to the transmission power of the dedicated physical control channel. The first selecting unit selects as the reduction target terminal the radio terminal of which the transmission power ratio is smaller than a predetermined threshold.

In the first aspect of the present invention, the first selecting unit selects as the reduction target terminal the radio terminal that transmits the uplink user data at the transmission rate lower than the assigned transmission rate.

In the first aspect of the present invention, the radio terminal transmits the uplink user data to the base station at a transmission time interval assigned to the ratio terminal. The transmitting unit transmits a stop request to the radio terminal, the stop request requesting stop of using the transmission time interval assigned to the radio terminal. The first selecting unit selects as the reduction target terminal the radio terminal to which the transmitting unit fails to send the stop request.

In the first aspect of the present invention, the base station includes a determination unit configured to determine whether or not a total of an initial transmission rate and the assigned transmission rate exceeds the allowable receiving transmission rate when receiving a communication start request from a second radio terminal which starts a new communication, where the initial transmission rate is the transmission rate initially assigned to the second radio terminal. The first selecting unit selects the reduction target terminal when the total of the initial transmission rate and the assigned transmission rate exceeds the allowable receiving transmission rate.

In the first aspect of the present invention, the base station includes a detecting unit configured to detect a discard of the uplink user data received from the radio terminal. The first selecting unit selects the reduction target terminal when the detecting unit detects the discard of the uplink user data.

In the first aspect of the present invention, the radio communication system includes: a serving cell configured to transmit, to the radio terminal as the transmission rate control data, absolute transmission rate control data for directly indicating the transmission rate of the uplink user data and relative transmission rate control data for relatively indicating the transmission rate of the uplink user data; and a non-serving cell configured to transmit the relative transmission rate control date to the radio terminal without transmitting the absolute transmission rate control data. The serving cell includes the first selecting unit the first calculating unit the second selecting unit, the second calculating unit and the transmitting unit. The non-serving cell includes an instructing unit configured to instruct the serving cell to decrease the transmission rate of the uplink user data when received power of the uplink user data received from the radio terminal exceeds a predetermined interference threshold. The first selecting unit selects the reduction target terminal according to an instruction of the instructing unit.

In the first aspect of the present invention, the radio terminal transmits the uplink user data to the base station at a transmission time interval assigned to the radio terminal. The base station includes a specifying unit configured to specify a decrease target transmission time interval being the transmission time interval in which a total of transmission rates assignable by the base station exceeds the allowable receiving transmission rate. The first selecting unit selects the reduction target terminal at the decrease target transmission time interval.

In the first aspect of the present invention, the first selecting unit selects the reduction target terminal when a difference between total received power in a bandwidth used for reception from the radio terminal and target received power targeted in the bandwidth falls within a predetermined range.

A second aspect of the present invention is summarized as a radio communication method in which a radio terminal transmits uplink user data to a base station through an enhanced dedicated physical data channel and the base station transmits transmission rate control data for controlling a transmission rate of the uplink user data to the radio terminal. The radio communication method includes: (A) causing the base station to select as a reduction target terminal the radio terminal of which an assigned transmission rate is to be reduced, where the assigned transmission rate is the transmission rate that the base station have already assigned to the radio terminal; (B) causing the base station to calculate a reduction amount of the assigned transmission rate assigned to the reduction target terminal selected in the (A); (C) causing the base station to select as an increase target terminal the radio terminal of which the assigned transmission rate is to be increased; (D) causing the base station to calculate an increase amount of the assigned transmission rate assigned to the increase target terminal selected in the (C); and (E) causing the base station to transmit to the reduction target terminal, the transmission rate control data indicating the transmission rate after the assigned transmission rate is reduced by the reduction amount and to transmit, to the increase target terminal, the transmission rate control data indicating the transmission rate after the assigned transmission rate is increased by the increase amount. In the (C), the increase target terminal is selected when the reduction target terminal is not selected in the (A). In the (D), the increase amount is calculated not to exceed an allowable receiving transmission rate, when the reduction target terminal is not selected in (A), and the allowable receiving transmission rate is equal to or lower than a maximum receiving transmission rate assignable by the base station.

A third aspect of the present invention is summarized as a base station which receives uplink user data from a radio terminal though an enhanced dedicated physical data channel and transmits transmission rate control data for controlling a transmission rate of the uplink user data to the radio terminal. The base station includes: a first selecting unit configured to select as a reduction target terminal the radio terminal of which an assigned transmission rate is to be reduced, where the assigned transmission rate is the transmission rate that the base station have already assigned to the radio terminal, a first calculating unit configured to calculate a reduction amount of the assigned transmission rate assigned to the reduction target terminal selected by the first selecting unit; a second selecting unit configured to select as an increase target terminal the radio terminal of which the assigned transmission rate is to be increased; a second calculating unit configured to calculate an increase amount of the assigned transmission rate assigned to the increase target terminal selected by the second selecting unit, and a transmitting unit configured to transmit, to the reduction target terminal, the transmission rate control data indicating the transmission rate after the assigned transmission rate is reduced by the reduction amount and to transmit, to the increase target terminal, the transmission rate control data indicating the transmission rate after the assigned transmission rate is increased by the increase amount. The second selecting unit selects the increase target terminal when the reduction target terminal is not selected by the first selecting unit. The second calculating unit calculates the increase amount not to exceed an allowable receiving transmission rate, when the reduction target terminal is not selected by the first selecting unit. The allowable receiving transmission rate is equal to or lower than a maximum receiving transmission rate assignable by the base station.

BRIEF DESCRIPTION OF THE DRAWINGS

FIG. 13 is a view showing one example of transmission rate control according to the fifth embodiment.

DETAILED DESCRIPTION OF THE EMBODIMENTS

Figure 1:
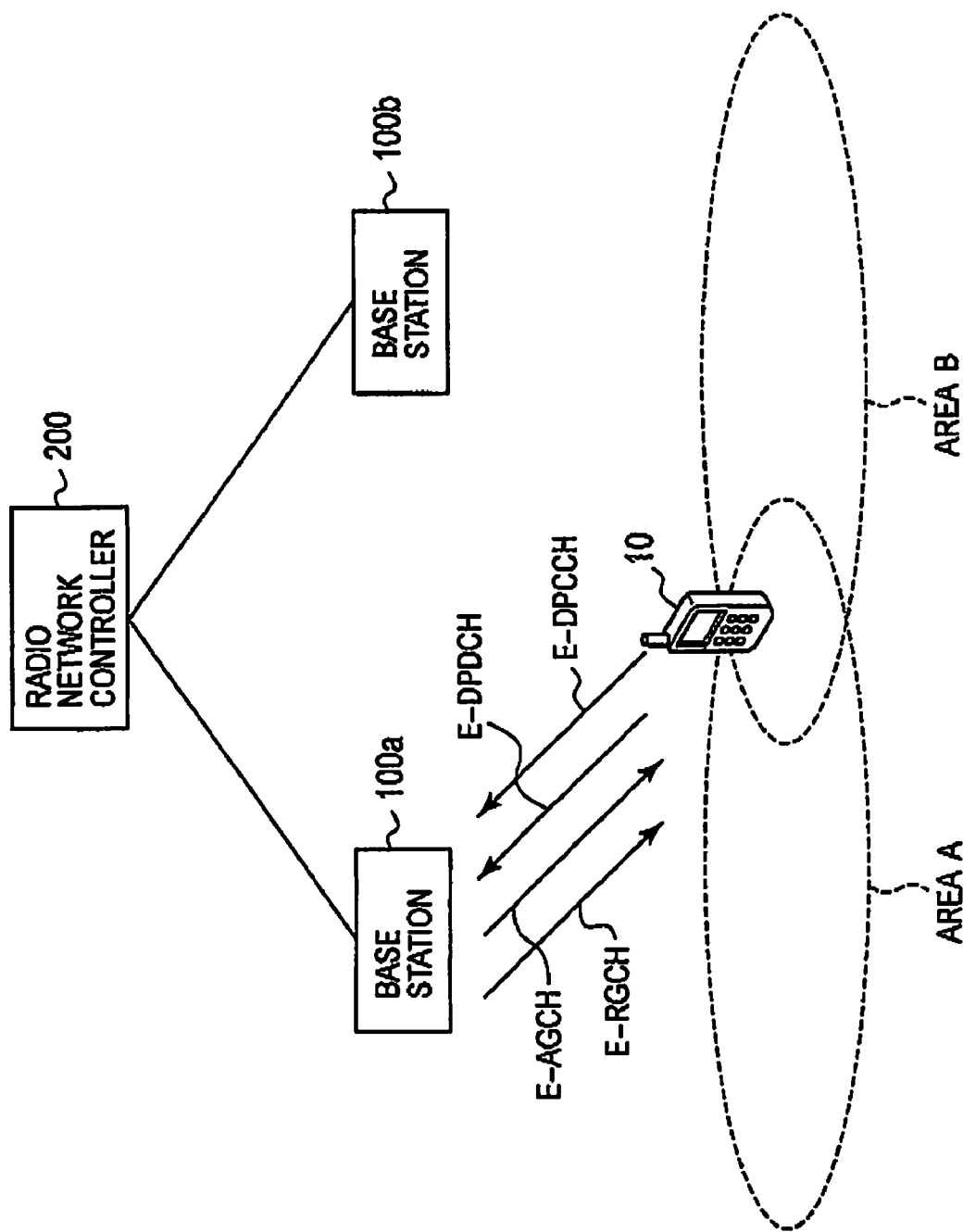
FIG. 1 is a view showing a radio communication system according to a first embodiment.

The configuration of a radio communication system according to an embodiment of the present invention will be described below by referring to the drawings. In the following description of the drawings, the same or similar reference numerals will be given to denote the same or similar portions.

However, it should be noted that the drawings are schematic and ratios of dimensions and others are different from actual ones. Therefore, specific dimensions and others should be determined by taking into consideration the following description. Moreover, as a matter of course, also among the drawings, there are included portions in which dimensional relationships and ratios are different from each other.

First Embodiment

Configuration of Radio Communication System

The configuration of a radio communication system according to a first embodiment will be described below by referring to the drawings. FIG. 1 is a view showing a radio communication system according to the first embodiment.

As shown in FIG. 1, the radio communication system has a radio terminal 10, a base station 100 (base station 100*a* or base station 100*b*), and a radio network controller 200. Note that FIG. 1 shows the case in which the radio terminal 10 communicates with the base station 100*a*.

The radio terminal 10 transmits uplink user data to the base station 100*a*. Specifically, the radio terminal 10 transmits the uplink user data to the base station 100*a* through a Dedicated Physical Data Channel (DPDCH) in a framework in which the radio network controller 200 performs radio resource assignment and others. The framework in which the radio network controller 200 performs radio resource assignment and others is sometimes referred to as Release 99 (R99) and others.

The radio terminal 10 transmits uplink control data to the base station 100*a* through a Dedicated Physical Control Channel (DPCCH) in a framework in which a radio network controller 200 performs radio resource assignment and others.

Note that transmission power of DPCCH is controlled by a TPC command which the radio terminal 10 receives from the base station 100, as in the case of general closed-loop power control. The TPC command is a command generated by the base station 100 by comparing a receiving quality of an uplink signal with a target quality thereof.

Meanwhile, the radio terminal 10 transmits uplink user data to the base station 100*a* through an Enhanced Dedicated Physical Data Channel (E-DPDCH) in a framework in which the base station 100 performs radio resource assignment and others. The framework in which the base station 100 performs radio resource assignment and others is sometimes referred to as High Speed Uplink Packet Access (HSUPA), Enhanced Uplink (EUL) and others.

Here, the uplink user data is divided into blocks for each Transmission Time Interval (TTI), that is, for each process (HARQ process). Each of the blocks is transmitted by use of a process (hereinafter referred to as an active process) which is assigned to the radio terminal 10.

Moreover, the predetermined number of processes (process #1 to process #n) constitutes one cycle (HARQ RRT) and is repeated for each cycle. Note that the number of processes included in one cycle is set according to a TI length. For example, when the TTI length is 2 ms, the number of processes included in one cycle is "8". For example, when the TTI length is 10 ms, the number of processes included in one cycle is "4".

Here, the radio terminal 10 has a table for associating a transmission power ratio with the transmission rate for the uplink user data transmitted through the E-DPDCH. The transmission power ratio is a ratio of transmission power of the E-DPDCH to transmission power of the DPCCH (E-DPDCH/DPCCH). The transmission rate is represented by Transport Block Size (TBS).

The transmission power ratio assigned to the radio terminal 10 will be hereinafter referred to as a Scheduling Grant (SG). Note that the transmission power ratio and the transmission rate are associated one-to-one with each other. Thus, the Scheduling Grant (SG) may be considered not only as a term representing the transmission power ratio assigned to the radio terminal 10 but also as a term representing the transmission rate assigned to the radio terminal 10.

Note that, as will be described later, the radio terminal 10 updates the SG according to transmission rate control data (AG or RG) which is received from the base station 100a (see, 3GPP TS25.321 Ver. 7.5.0 11.8.1.3 "Serving Grant Update"). Subsequently, the radio terminal 10 determines a transmission rate (that is, TBS) corresponding to the SG by referring to the table for associating the transmission power ratio with the transmission rate (see, 3GPP TS25.321 Ver. 7.5.0 11.8.1.4 "E-TFC Selection").

The radio terminal 10 transmits uplink control data to the base station 100a through an Enhanced Dedicated Physical Control Channel (E-DPCCH) and others in a framework in which the base station 100 performs radio resource assignment and others. The uplink control data includes uplink control data (UL Scheduling Information) and others which the base station 100a refers in radio resource assignment.

The uplink control data includes "Highest priority Logical Channel ID (HLID)", "Total E-DCH Buffer Status (TEBS)", "Highest priority Logical Channel Buffer Status (HLBS)", "User Power Headroom (UPH)", "Happy Bit", "CQI" and others (see, 3GPP TS25.321 Ver. 7.5.0 9.2.5.3 "UL Scheduling Information").

The "HLID" is an identifier for identifying a highest priority logical channel among logical channels for transporting the uplink user data.

The "TEBS" is information indicating an amount (buffer amount) of the uplink user data accumulated in a transmission buffer provided in the radio terminal 10.

The "HLBS" is an amount (buffer amount) of uplink user data corresponding to the logical channel identified by the HLID among the uplink user data accumulated in the transmission buffer provided in the radio terminal 10.

The "UPH" is a transmission power ratio that is a ratio of Maximum UE Transmission Power to transmission power of the DPCCH. The Maximum UE Transmission Power is a maximum transmission power allowed for the radio terminal 10. For example, the UPH is represented by "maximum transmission power"/"transmission power of DPCCH".

The "Happy Bit" is happiness information indicating whether or not the SG assigned to the radio terminal 10 is sufficient. As the "Happy Bit", "Happy" indicates that the SG assigned to the radio terminal 10 itself is sufficient and "Unhappy" indicates that the SG assigned to the radio terminal 10 itself is insufficient. Note that "Happy Bit" is expressed by one bit.

Note that the radio terminal 10 may transmit "Happy Bit" to the base station 100 at a timing different from that of the scheduling information including the above-described various pieces of information ("HLID", "TEBS", "HLBS", and "UPH").

The "CQI" is a reception quality value indicating a reception quality of a downlink signal (for example, Common Pilot Channel (CPICH)) which the radio terminal 10 receives from the base station 100.

Figure 2:
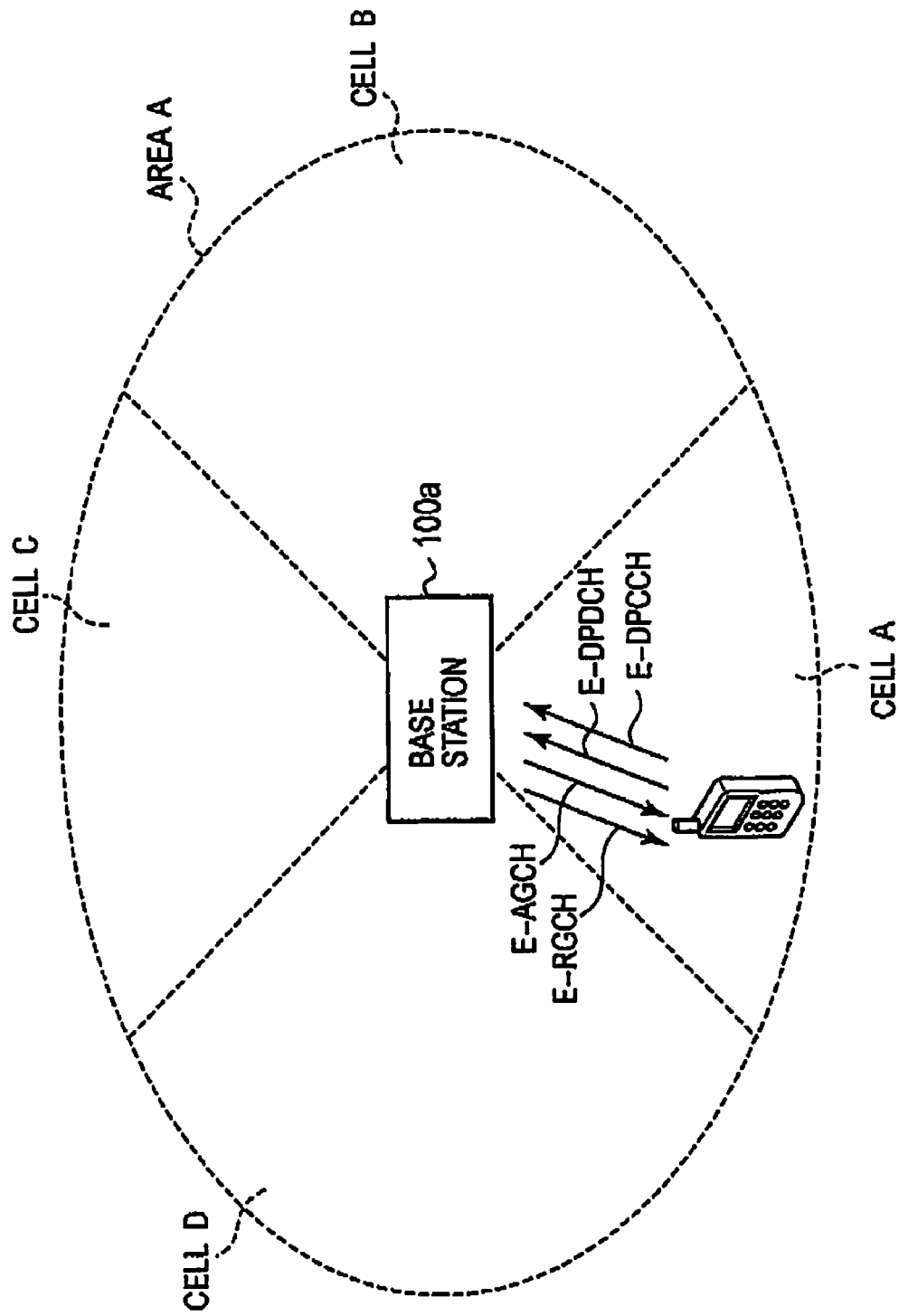
FIG. 2 is a view showing the radio communication system according to the first embodiment.

The base station 100a, as shown in FIG. 2, has multiple cells (cells A to D), and each of the cells communicates with the radio terminal 10 located within their own cells. Each of the cells functions as a serving cell in some cases and as a non-serving cell in other cases.

Note that the "cell" is basically used as a term representing a function for communicating with the radio terminal 10.

Note also that the "cell" is sometimes used as a term representing an area in which the radio terminal 10 is located.

For example, in FIG. 2, considered is a case where the radio terminal 10 executes communications according to an instruction of an EUL scheduler provided in the cell A (that is, a case where communications are executed according to AG received from the cell A through E-AGCH). In this case, the cell A is a serving cell for the radio terminal 10 and the cells B to D are non-serving cells for the radio terminal 10. On the other hand, the radio terminal 10 is a serving terminal for the cell A and a non-serving terminal for the cells B to D.

The base station 100 receives the uplink user data from the radio terminal 10 through a data channel, such as DPDCH or E-DPDCH. On the other hand, the base station 100 transmits, to the radio terminal 10, transmission rate control data for controlling a transmission rate of the uplink user data which is transmitted through E-DPDCH. The transmission rate control data includes an absolute transmission rate control data (Absolute Grant; AG) for directly indicating the transmission rate and a relative transmission rate control data (Relative Grant; RG) for relatively indicating the transmission rate.

The absolute transmission rate control data (AG) is data (Index) which directly indicates the transmission power ratio (E-DPDCH/DPCCH) assigned to the radio terminal 10 (see, 3GPP TS25.212 Ver. 7.5.0 4.10.1A.1 "Information field mapping of the Absolute Grant Value").

As described above, the absolute transmission rate control data (AG) is a command which directly indicates a value of the transmission rate without depending on the current transmission rate.

The relative transmission rate control data (RG) is date ("Up", "Down", or "Hold") which relatively indicates the transmission power ratio (E-DPDCH/DPCCH) assigned to the radio terminal 10 (see, 3GPP TS25.321 Ver. 7.5.0 9.2.5.2.1 "Relative Grants").

As described above, the relative transmission rate control data (RG) is a command relatively controlling the current transmission rate. Specifically, the relative transmission rate control data includes an increase command "Up" instructing an increase of the current transmission rate, a maintenance command "Hold" instructing maintenance of the current transmission rate, and a decrease command "Down" instructing a decrease of the current transmission rate. Note that the increase command is a command instructing an increase of the transmission rate by a predetermined increase range and the decrease command is a command instructing a decrease of the transmission rate by a predetermined decrease range. The predetermined increase range may have the same range as the predetermined decrease range or may have smaller range than the predetermined decrease range.

The base station 100a transmits the AG to the radio terminal 10 through an E-DCH Absolute Grant Channel (E-AGCH). The base station 100a transmits the RG to the radio terminal 10 through an E-DCH Relative Grant Channel (E-RGCH).

For example, the serving cell (here, cell A) transmits, to the radio terminal 10, the AG through the E-AGCH and the RG through the E-RGCH. On the other hand, the non-serving cell (here, cell B) transmits the RG to the radio terminal 10 through the E-RGCH without transmitting the AG to the radio terminal through the E-AGCH.

Note that, in FIGS. 1 and 2, channels used for R99 (such as DPDCH and DPCCH) are not shown for simplifying the description, and a number of radio terminals 10 are present in each cell in practice.

Note that the cell that the radio terminal 10 uses as a serving cell is not limited to one cell but may be multiple cells.

Note that in the EUL, the transmission rate assigned to the radio terminal 10 is controlled by the transmission rate control data (AG or RG) for each TTI. Meanwhile, in R99, the transmission rate assigned to the radio terminal 10 can be controlled only by a period longer than 1 TTI.

(Configuration of Radio Terminal)

Figure 3:
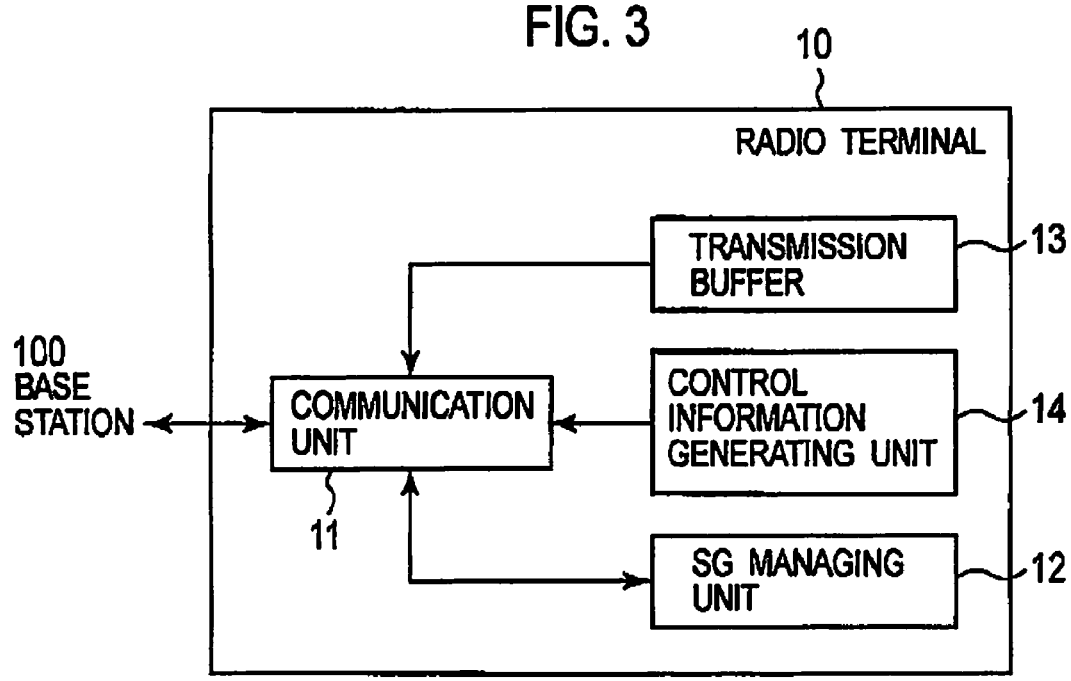
FIG. 3 is a block diagram showing a radio terminal 10 according to the first embodiment.

The configuration of the radio terminal according to the first embodiment will be described below by referring to the drawings. FIG. 3 is a block diagram showing the radio terminal 10 according to the first embodiment.

As shown in FIG. 3, the radio terminal 10 includes a communication unit 11, an SG managing unit 12, a transmission buffer 13, and a control information generating unit 14.

The communication unit 11 communicates with the base station 100. Specifically, the communication unit 11 transmits uplink user data to the base station 100 through the E-DPDCH. The communication unit 11 transmits uplink control data (for example, the UL scheduling information described above) to the base station 100 through the E-DPCCH. Meanwhile, the communication unit 11 receives, from the base station 100, transmission rate control data (AG or RG described above) for controlling a transmission rate of the uplink user data.

The SG managing unit 12 manages an SG assigned for the uplink user data. The SG managing unit 12 has a table for associating a transmission power ratio (SG) with a transmission rate (TBS).

As described above, the SG managed by the SG managing 12 is controlled by the AG or the RG received from the base station 100. The transmission rate of the uplink user data is selected within a range that does not exceed the TBS associated with the SG.

The transmission buffer 13 is a buffer for accumulating the uplink user data. The communication unit 11 described above transmits the uplink user date accumulated in the transmission buffer 13.

The control information generating unit 14 generates uplink control data which is used by the base station 100a in radio resource assignment.

As described above, the uplink control data includes "HLID", "TEBS", "HLBS", "UPH", "Happy Bit", "CQI", and others. As a matter of course, the control information generating unit 14 generates the uplink control data after acquiring "HLID", "TEBS", "HLBS", "UPH", "Happy Bit" and others. Note that the control information generating unit 14 may generate "Happy Bit" separately from the scheduling information including "HLID", "TEBS", "HLBS" and "UPH".

(Configuration of Base Station)

Figure 4:
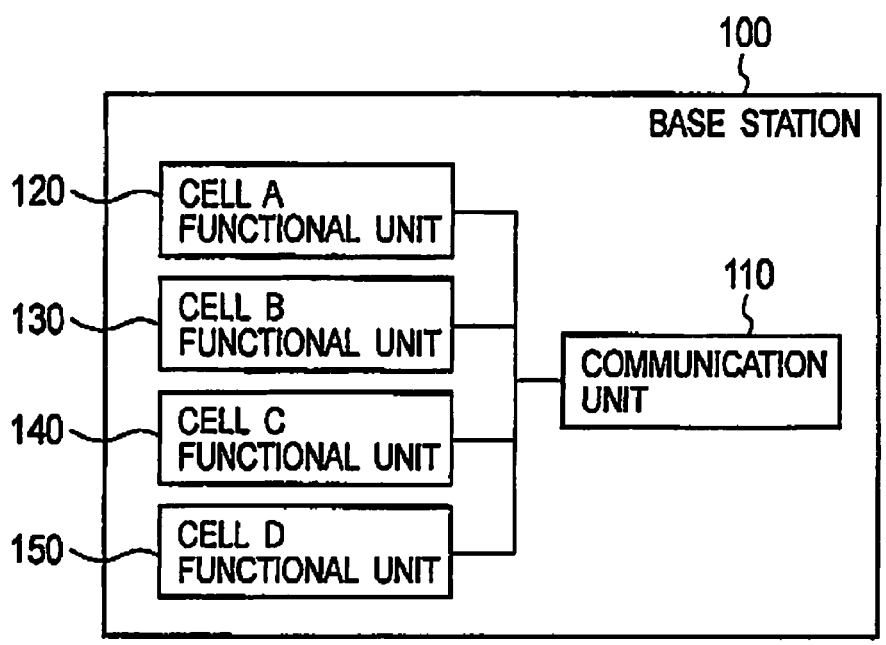
FIG. 4 is a block diagram showing a base station 100 according to the first embodiment.

The configuration of the base station according to the first embodiment will be described below by referring to the drawings. FIG. 4 is a block diagram showing the radio base station 100 according to the first embodiment.

As shown in FIG. 4, the base station 100 has a communication unit 110, a cell A functional unit 120, a cell B functional unit 130, a cell C functional unit 140, and a cell D functional unit 150.

The communication unit 110 communicates with the radio terminals 10 located in the cells A to D. Specifically, the communication unit 110 receives the uplink user data from each of the radio terminals 10 through the data channel, such as the DPDCH or the E-DPDCH. The communication unit 110 receives uplink control data from the radio terminal 10 through the control channel, such as the DPCCH or the E-DPCCH. Meanwhile, the communication unit 110 transmits transmission rate control data (AG or RG) to the radio terminal 10 through the control channel, such as the E-AGCH and the E-RGCH.

Note that the communication unit 110 also communicates with an upper station (such as a radio network controller or a switching system) which manages the base station 100.

The cell A functional unit 120 functions as a serving cell for the radio terminal 10 located in the cell A. Meanwhile, the cell A functional unit 120 functions as a non-serving cell for the radio terminals 10 located in the cells B to D.

The cell B functional unit 130 functions as a serving cell for the radio terminal 10 located in the cell B. Meanwhile, the cell B functional unit 130 functions as a non-serving cell for the radio terminals 10 located in the cells A, C and D.

The cell C functional unit 140 functions as a serving cell for the radio terminal 10 located in the cell C. Meanwhile, the cell C functional unit 140 functions as a non-serving cell for the radio terminals 10 located in the cells A, B and D.

The cell D functional unit 150 functions as a serving cell for the radio terminal 10 located in the cell D. Meanwhile, the cell D functional unit 150 functions as a non-serving cell for the radio terminals 10 located in the cells A to C.

(Cell Configuration)

Figure 5:
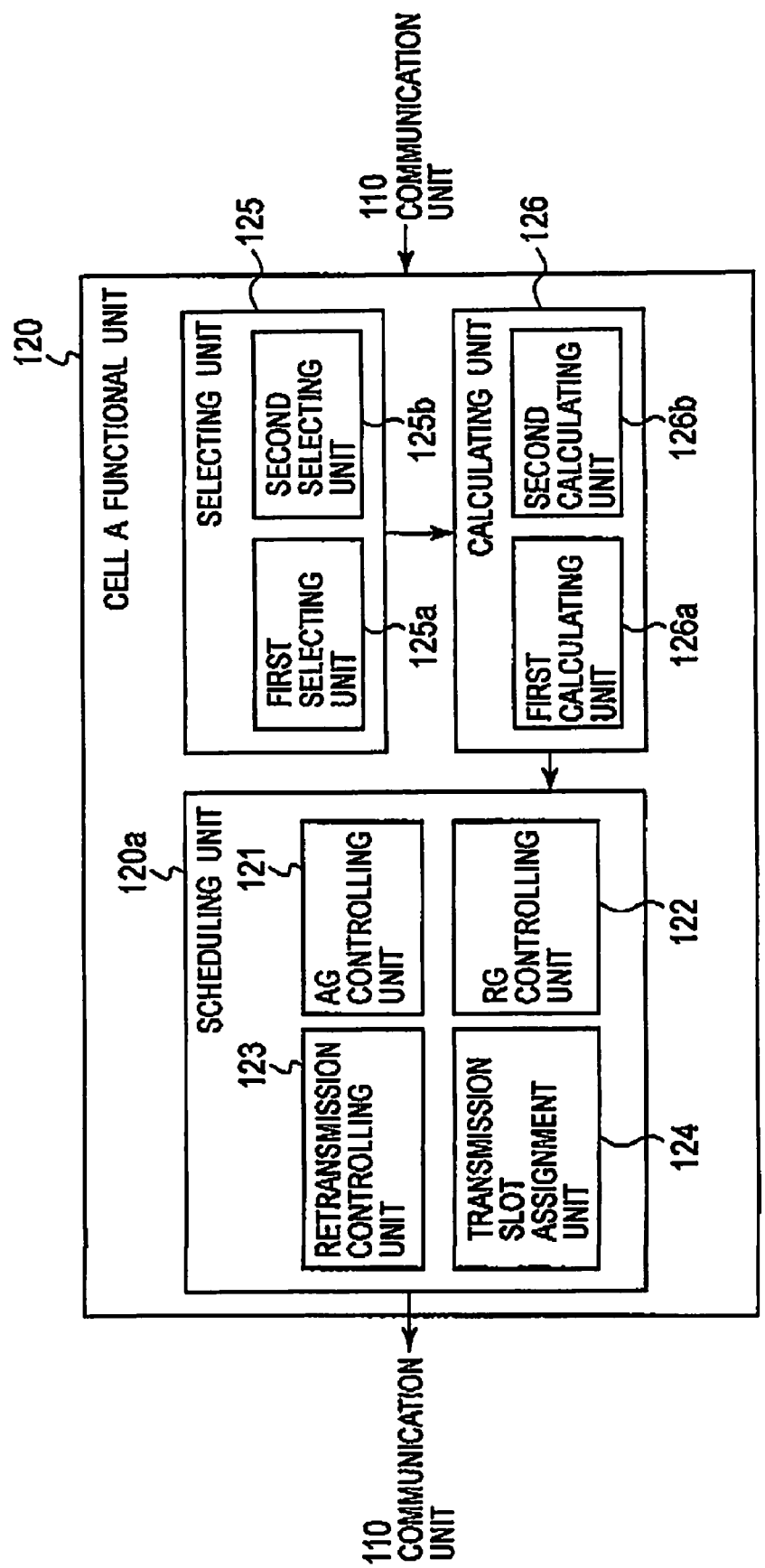
FIG. 5 is a block diagram showing a cell A functional unit 120 according to the first embodiment.

The configuration of a cell according to the first embodiment will be described below by referring to the drawings. FIG. 5 is a block diagram showing the cell (cell A functional unit 120) according to the first embodiment. Here, the description will be given of, for example, the case where the cell A functional unit 120 functions as a serving cell.

As shown in FIG. 5, the cell A functional unit 120 has a scheduling unit 120a assigning a radio resource to the radio terminal 10 using the cell A as a serving cell, a selecting unit 125, and a calculating unit 126.

The scheduling unit 120a has an AG controlling unit 121, an RG controlling unit 122, a retransmission controlling unit 123, and a transmission slot assignment unit 124. The scheduling unit 120a operates in a media access control enhanced (MAC-e) layer.

The AG controlling unit 121 transmits the AG, through the E-AGCH, to the radio terminal 10 (serving terminal) using the cell A as a serving cell. Note that the AG is a command to directly indicate a transmission rate value without depending on the current transmission rate.

Here, the AG controlling unit 121 transmits, to the radio terminal 10, an AG (Inactive) requesting a stop of using the transmission time interval (that is, a process included in one cycle) assigned to the radio terminal 10, an AG (Zero Grant) indicating "0" as the transmission rate assigned to the radio terminal 10, an AG (Floor Grant) indicating a minimum guaranteed transmission rate as the assigned transmission rate, and others. Note that the minimum guaranteed transmission rate is a transmission rate which is to be at least guaranteed for the radio terminal 10.

The RG controlling unit 122 transmits the RG, through the E-RGCH, to the radio terminal 10 (serving terminal) using the cell A as a serving cell. Note that the RG includes an increase command "Up", a maintenance command "Hold", and a decrease command "Down". As described above, the increase command "Up" is a command instructing an increase by a predetermined increase range and the decrease command "Down" is a command instructing a decrease by a predetermined decrease range.

Note that the AG controlling unit 121 and the RG controlling unit 122 control the SG to be assigned to the radio terminal 10 by referring to the uplink control data received from the radio terminal 10.

The retransmission controlling unit 123 determines for each block (each process) whether or not an error is caused in the uplink user data. Subsequently, the retransmission controlling unit 123 requests the radio terminal 10 to retransmit the block with the error (hereinafter, referred to as an error block). The retransmission control technique is a Hybrid Automatic Repeat Request (HARQ) technique, that combines a block which is firstly transmitted from the radio terminal 10 (hereinafter, referred to as a transmission block) and a block which is retransmitted from the radio terminal 10 (hereinafter, referred to as a retransmission block).

The transmission slot assignment unit 124 assigns, to the radio terminal 10, a transmission slot (that is, processes included in one cycle) used for transmission of the uplink user data (block) to be transmitted through the E-DPDCH. Note that the radio terminal 10 transmits the transmission block or the retransmission block to the base station 100 using the process (active process) assigned by the transmission slot assignment unit 124.

The selecting unit 126 includes a first selecting unit 125a and a second selecting unit 125b. The first selecting unit 125a selects the radio terminal 10 (reduction target terminal) whose assigned transmission rate assigned by the cell A functional unit 120 (base station 100) should be reduced.

Specifically, the first selecting unit 125a selects the reduction target terminal among the radio terminals 10 communicating with the cell A functional unit 120 (base station 100) in the EUL according to any one of the following selection criteria.

(1) The first selecting unit 125a selects the radio terminal 10 whose buffer amount is smaller than a predetermined threshold as a reduction target terminal by referring to "TEBS" included in the uplink control data. Here, it is preferable that the first selecting unit 125a preferentially selects the radio terminal 10 whose buffer amount is small. In other words, the radio terminal whose buffer amount is small is more likely to be selected as a reduction target terminal when compared with the radio terminal 10 whose buffer amount is large.

(2) The first selecting unit 125a selects the radio terminal 10 whose happiness rate (Happy Bit Rate) is higher than a predetermined threshold as a reduction target terminal by referring to "Happy Bit" included in the uplink control data. Note that each radio terminal 10 has a predetermined priority (Priority Class). Here, it is preferable that the first selecting unit 125a preferentially selects the radio terminal 10 whose happiness rate (the Happy Bit Rate) is high. In other words, the radio terminal 10 whose happiness rate is higher is more likely to be selected as a reduction target terminal than the radio terminal 10 whose happiness rate is lower. The happiness rate (the Happy Bit Rate) may be calculated as "Happy"/"Unhappy" In a predetermined period or "Happy"/("Happy"+"Unhappy") in a predetermined period.

Here, it is preferable that the first selecting unit 125a selects a control target terminal as a reduction target terminal when: the priority class assigned to the radio terminal 10 (control target terminal) whose transmission rate should be controlled is lower than the priority class assigned to a comparison target terminal; and the happiness rate of the comparison target terminal is lower than a predetermined threshold. In this case, it may also be included as a condition that the happiness rate of the control target terminal is higher than the predetermined threshold.

(3) The first selecting unit 125a selects the radio terminal 10 whose transmission power ratio is smaller than a predetermined threshold as a reduction target terminal by referring to "UPH" included in the uplink control data. Here, it is preferable that the first selecting unit 125a preferentially selects the radio terminal 10 whose transmission power ratio is small. In other words, the radio terminal 10 whose transmission power ratio is small is more likely to be selected as a reduction target terminal when compared with the radio terminal 10 whose transmission power ratio is large. The "UPH" is a transmission power ratio that is a ratio of the Maximum UE Transmission Power to transmission power of DPCCH. Note that the radio terminal 10 whose transmission power ratio is small is considered to have large DPCCH transmission power and be located in a cell edge.

(4) The first selecting unit 125a selects, as a reduction target terminal, the radio terminal 10 that transmits the uplink user data at a transmission rate lower than the assigned transmission rate. Here, it is preferable that the first selecting unit 125a preferentially selects the radio terminal 10 having a large gap between the assigned transmission rate and the transmission rate used for transmitting the uplink user data. In other words, the radio terminal 10 having a larger gap therebetween is more likely to be selected as a reduction target terminal than the radio terminal 10 having a smaller gap therebetween.

(5) The first selecting unit 125a selects, as a reduction target terminal, the radio terminal 10 to which the AG (Inactive) fails to be transmitted although the determination is once made that the AG (inactive) is to be transmitted to the radio terminal 10. One of the reasons why the AG (Inactive) cannot be transmitted is that the transmission time interval (in other words, processes included in one cycle) assigned to the radio terminal 10 has been already inactive.

The second selecting unit 125b selects the radio terminal 10 (increase target terminal) in which the assigned transmission rate being a transmission rate which has already been assigned by the cell A functional unit 120 (base station 100) should be increased. For example, the second selecting unit 125b selects, as an increase target terminal, a radio terminal 10 in an ascending order from the radio terminals 10 whose priority (Priority Class) are high.

Note that the second selecting unit 125b selects the increase target terminal when the reduction target terminal is not selected by the first selecting unit 125a.

The calculating unit 126 includes a first calculating unit 126a and a second calculating unit 126b. The first calculating unit 126a calculates a reduction amount of the assigned transmission rate assigned to the radio terminal 10 (reduction target terminal) selected by the first selecting unit 125a.

The method of reducing the assigned transmission rate includes (a) a request to stop using the transmission time interval (that is, processes included in one cycle)(transmission of AG (inactive)), (b) indication of "0" as the assigned transmission rate (transmission of AG (Zero Grant)), (C) indication of the minimum guaranteed transmission rate as the assigned transmission rate (transmission of AG (Floor Grant)), (d) transmission of AG indicating a proper value, and (e) transmission of RG instructing a decrease of the predetermined decrease range. Note that the minimum guaranteed transmission rate is a transmission rate which should be at least guaranteed for the radio terminal 10.

For example, the first calculating unit 126a selects the transmission of AG (Zero Grant) for the radio terminal 10 selected by "TEBS" included in the uplink control data as the method of reducing the assigned transmission rate. The first calculating unit 126a selects the transmission of AG (Floor Grant) for the radio terminal 10 which transmits the uplink user data at a transmission rate lower than the assigned transmission rate as the method of reducing the assigned transmission rate. The first calculating unit 126a selects the transmission of AG indicating a proper value for the radio terminal 10 selected by "UPH" included in the uplink control data as the method of reducing the assigned transmission rate after the proper value is calculated based on the UPH. The first calculating unit 126*a* selects the transmission of RG instructing a decrease of the predetermined decrease range for the radio terminal 10 selected by "Happy Bit" included in the uplink control data.

The second calculating unit 126*b* calculates an increase amount of the assigned transmission rate assigned to the radio terminal 10 (increase target terminal) selected by the second selecting unit 125*b* not to exceed the allowable receiving transmission rate. The allowable receiving transmission rate is equal to or lower than the maximum receiving transmission rate which is assignable by the base station 100 (here, cell A).

Note here that the second calculating unit 126*b* calculates the increase amount of the assigned transmission rate assigned to the increase target terminal when the reduction target terminal is not selected by the first selecting unit 125*a*.

The method of increasing the assigned transmission rate includes (a) transmission of AG requesting permission of using (Active) the inactive transmission time interval (that is, processes included in one cycle) within a range in which the number of active processes does not exceed the maximum value, (b) transmission of AG indicating a proper value, and (c) transmission of RG instructing a decrease of the predetermined decrease range.

For example, the second calculating unit 126*b* calculates the proper value based on "CQI" included in the uplink control data, and, thereafter, selects the transmission of AG indicating the proper value as the method of increasing the assigned transmission rate. The second calculating unit 126*b* calculates the proper value based on "UPH" included in the uplink control data, and, thereafter, selects the transmission of AG indicating the proper value as the method of increasing the assigned transmission rate. The second calculating unit 126*b* calculates the proper value based on the maximum receiving transmission rate which is assignable by the base station 100, and, thereafter, selects the transmission of AG indicating the proper value as the method of increasing the assigned transmission rate.

(Operations of Base Station (Cell))

Figure 6:
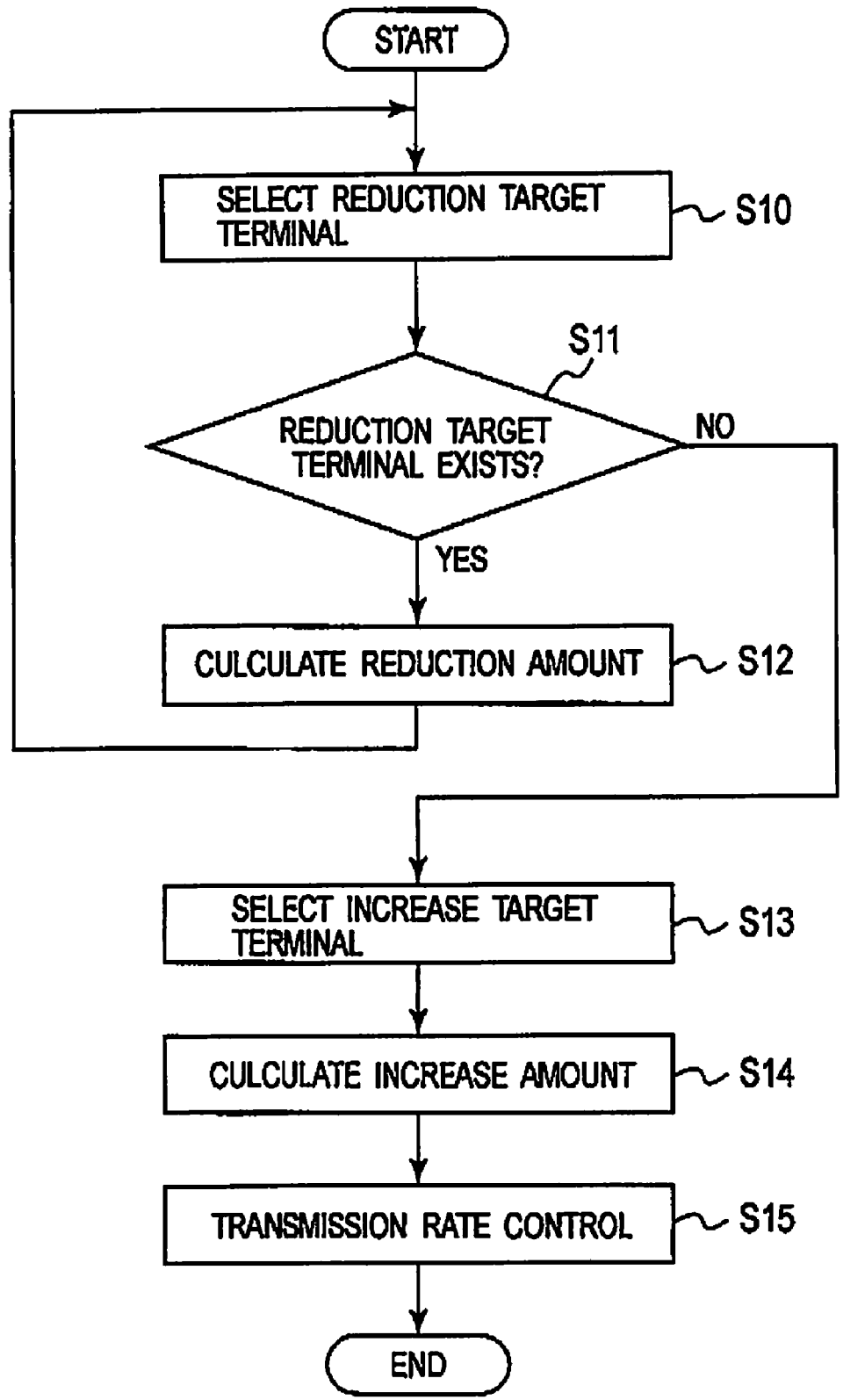
FIG. 6 is a flowchart showing an operation of the base station 100 (cell) according to the first embodiment.

The operations of the base station (cell) according to the first embodiment will be described below by referring to the drawings. FIG. 6 is a flowchart showing operations of the base station 100 (cell) according to the first embodiment.

As shown in FIG. 6, in step 10, the base station 100 selects the radio terminal 10 (reduction target terminal) in which the assigned transmission rate being a transmission rate assigned by the radio base station (own cell) should be reduced. When selecting the reduction target terminal, as described above, "TEBS", "Happy Bit", "Priority Class", "UPH", and others are considered.

At step 11, the base station 100 determines whether or not the radio terminal 10 is selected as a reduction target terminal, that is, whether or not there is a reduction target terminal. If the reduction target terminal is present, the base station 100 proceeds to the process in step 12. Meanwhile, if the reduction target terminal is absent, the base station 100 proceeds to the process in step 13.

At step 12, the base station 100 calculates a reduction amount of the assigned transmission rate assigned to the radio terminal 10 (reduction target terminal) selected in step 10.

At step 13, the radio base station 100 selects the radio terminal 10 (increase target terminal) in which the assigned transmission rate being a transmission rate assigned by the radio base station (own cell) should be increased.

At step 14, the base station 100 calculates an increase amount of the assigned transmission rate assigned to the radio terminal 10 (increase target terminal) selected in step 13.

At step 15, the base station 100 transmits the AG or RG to the radio terminal 10 (reduction target terminal) selected in step 10 according to the reduction amount (reduction method) calculated in step 12. In addition, the base station 100 transmits the AG or RG to the radio terminal 10 (increase target terminal) selected in step 13 according to the increase amount (increase method) calculated in step 14.

(Advantages and Effects)

In the first embodiment, the second selecting unit 125*b* performs selection of the increase target terminal and the second calculating unit 126*b* calculates the increase amount when the reduction target terminal is not selected by the first selecting unit 126*a*. That is, the decease of the assigned transmission rate is preferentially performed to the increase of the assigned transmission rate.

In this manner, the transmission rate is assigned to the radio terminal 10 after reserving an available radio resource, so that the maximum radio resource of the base station 100 can be effectively utilized.

Second Embodiment

A second embodiment will be described below by referring to the drawings. In the following description, differences between the first embodiment and the second embodiment will be mainly described.

In the second embodiment, a base station 100 (cell) selects a reduction target terminal according to the following triggers. Specifically, the base station 100 (cell) selects a reduction target terminal when the total of an initial transmission rate and an assigned transmission rate exceeds an allowable receiving transmission rate in a case where a communication start request is received from a radio terminal 10 (a second radio terminal) with which communications are to be started anew. The initial transmission rate is the transmission rate which is firstly assigned to the new radio terminal 10 (second radio terminal).

Here, the new radio terminal 10 (second radio terminal) may be a radio terminal which is to start communications anew in a framework (R99) in which a radio network controller 200 assigns a radio resource. The new radio terminal 10 (second radio terminal) may be a radio terminal which is to start communications anew in a framework (EUL) in which the base station 100 assigns a radio resource.

Note that the new radio terminal 10 (second radio terminal) may be a radio terminal which has already been in communication with the base station 100. Such a case includes a case where the radio terminal 10 having already been in communication with the base station 100 is to start communications anew.

(Cell Configuration)

Figure 7:
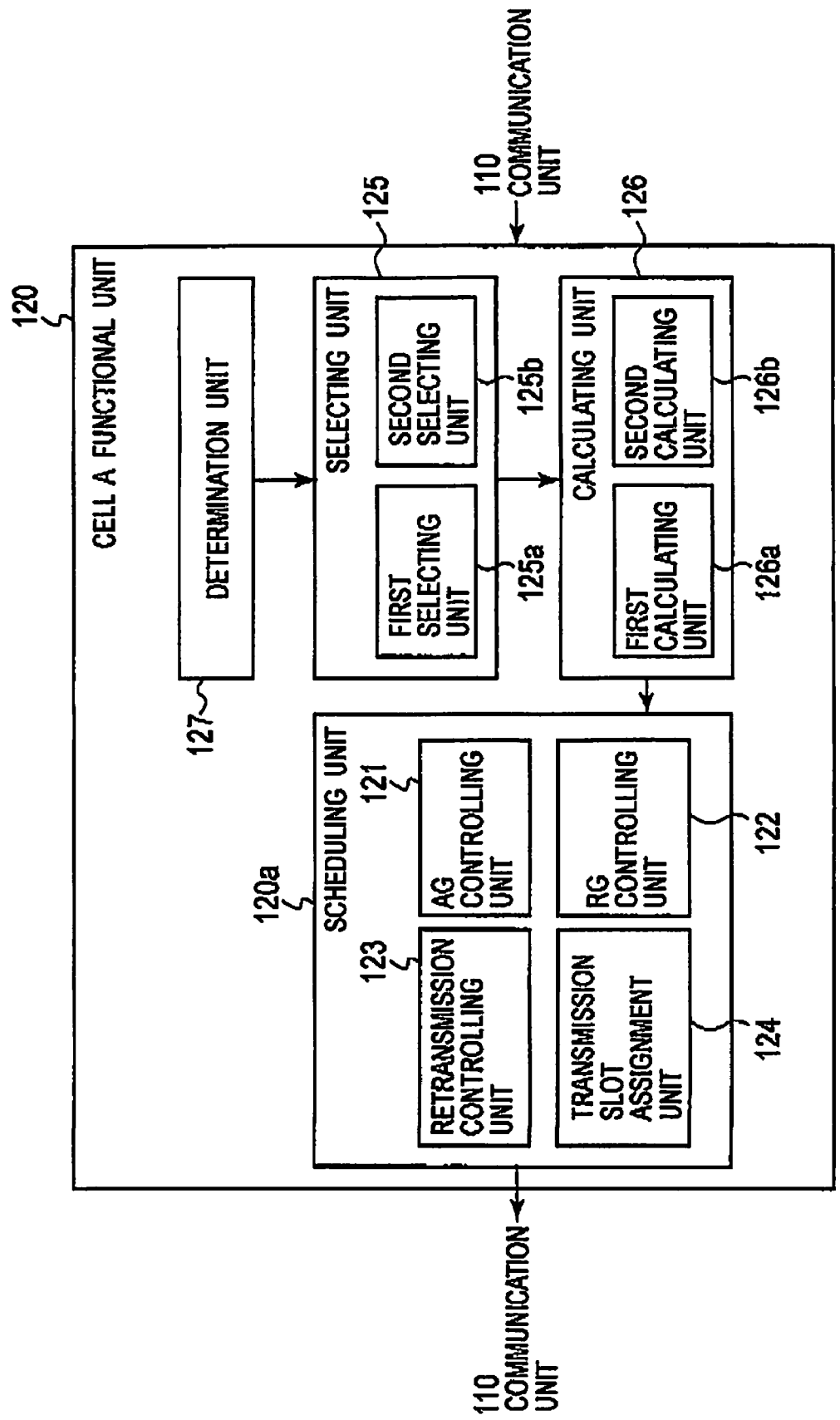
FIG. 7 is a block diagram showing a cell A functional unit 120 according to a second embodiment.

The configuration of a cell according to the second embodiment will be described below by referring to the drawings. FIG. 7 is a block diagram showing a cell (cell A functional unit 120) according to the second embodiment. Here, the case where the cell A functional unit 120 functions as a serving cell will be described as an example. In FIG. 7, similar reference numerals are given to denote components similar to those of FIG. 5.

As shown in FIG. 7, the cell A functional unit 120 includes a determination unit 127 in addition to the configuration shown in FIG. 5.

The determination unit 127 determines whether or not the total of the initial transmission rate and the assigned transmission rate exceeds the maximum receiving transmission rate when a communication start request is received from the new radio transmission terminal 10 (second radio terminal).

The initial transmission rate is a transmission rate which should be firstly assigned to the new radio terminal 10 (second radio terminal). The assigned transmission rate is a transmission rate which has already been assigned by the base station 100 (here, cell A). Note that the assigned transmission rate includes a transmission rate which is assigned to the radio terminal 10 performing communications in the R99 and a transmission rate which is assigned to the radio terminal 10 performing communications in the EUL.

The maxmum receiving transmission rate is the total of the transmission rates which the base station 100 (here, cell A) can assign to the radio terminals 10. The maximum receiving transmission rate may be considered as an upper limit of the radio resource (maximum radio resource) which is assignable to the radio terminals 10.

Note that similar to the first embodiment, the above-described selecting unit 125 selects the radio terminal 10 (reduction target terminal) whose transmission rate is reduced among the radio terminals 10 communicating with the base station 100 in the EUL in consideration of "TEBS", "Happy Bit", "Priority Class", "UPH", and others in a case where the total of the initial transmission rate and the assigned transmission rate exceeds the maximum receiving transmission rate.

(One Example of Transmission Rate Control)

Figure 8:
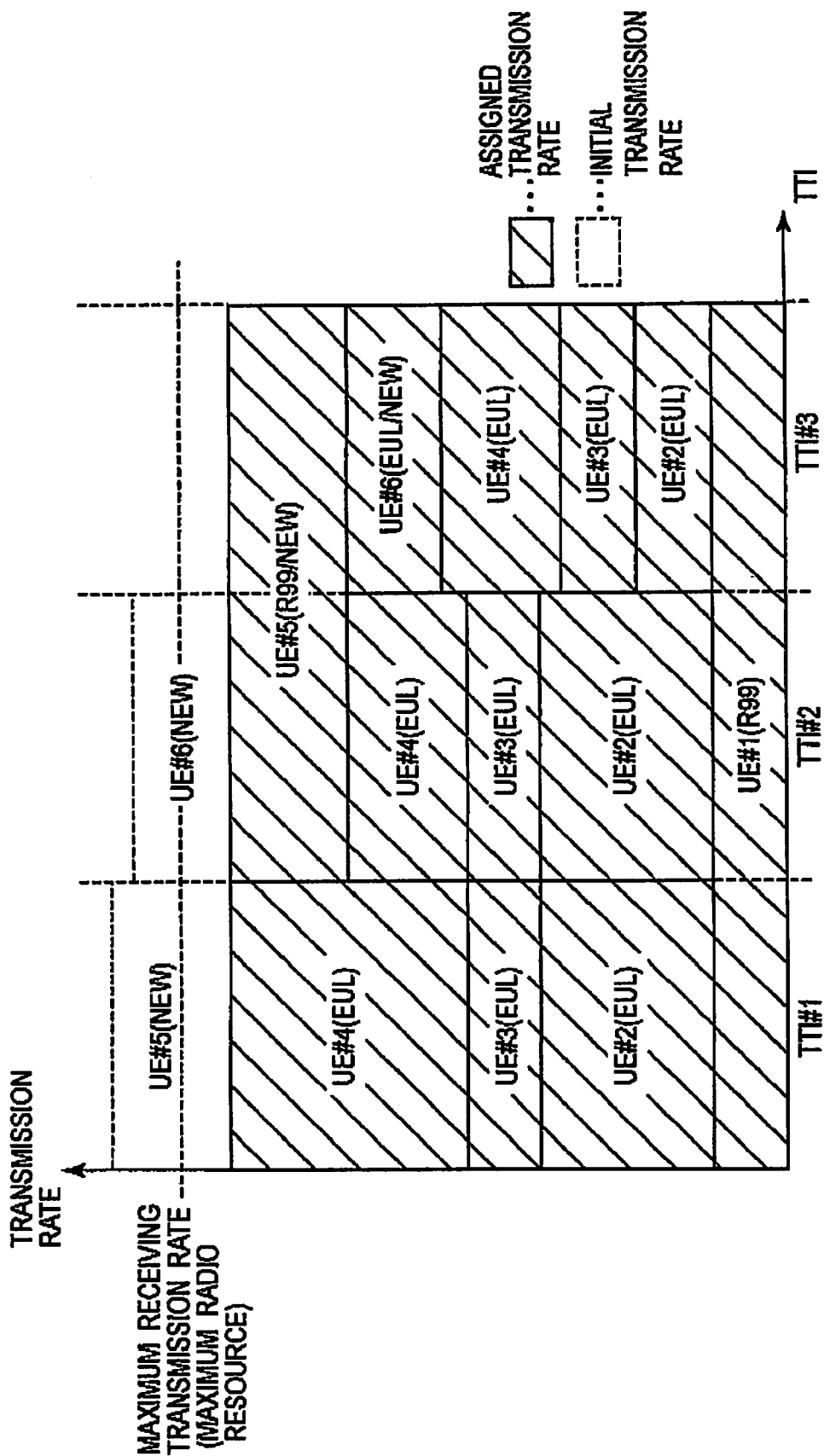
FIG. 8 is a view showing one example of transmission rate control according to the second embodiment.

One example of transmission rate control according to the second embodiment will be described below. FIG. 8 is a view showing one example of the transmission rate control according to the second embodiment.

As shown in FIG. 8, at TTI #1, radio terminals UE#1 to UE#4 are in communication with the base station 100. The radio terminal UE#1 is a radio terminal 10 performing communications in the R99. The radio terminals UE#2 to UE#4 are radio terminals 10 performing communications in the EUL.

Here, considered is the case where a communication start request is received from the radio terminal UE#5 at TTI #1. The radio terminal UE#5 is a radio terminal 10 (second radio terminal) which is to start communications anew in the R99. In such a case, when an initial transmission rate is assigned to the radio terminal UE#5, the total of transmission rates to be assigned to the radio terminals UE#1 to UE#5 (the total of the initial transmission rate and the assigned transmission rate) exceeds the maximum receiving transmission rate.

Accordingly, similar to the first embodiment, the base station 100 selects the reduction target terminal among the radio terminals UE#1 to UE#4 in consideration of "TEBS", "Happy Bit", "Priority Class", "UPH", and others. In other words, the base station 100 transmits the transmission rate decrease data (AG or RG) to any one of the radio terminals UE#1 to UE#4 to decrease the assigned transmission rate.

Here, the base station 100 selects the radio terminal UE#4 as a reduction target terminal, and, thereafter, transmits the transmission rate decrease data to the radio terminal UE#4.

Note that the transmission rate of the radio terminal UE#1 cannot be controlled for every TTI because the radio terminal UE#1 performs communications in the R99. Accordingly, the radio terminal UE#1 is excluded from a candidate for the reduction target terminal. Having the minimum transmission rate, the radio terminal UE#3 may be excluded from a candidate for the reduction target terminal.

As a result, at TTI #2, the total of the transmission rates assigned to the radio terminals UE#1 to UE#5 (the total of the initial transmission rate and the assigned transmission rate) does not exceed the maximum receiving transmission rate even if the initial transmission rate is assigned to the radio terminal UE#5.

Subsequently, considered is the case where a communication start request is received from the radio terminal UE#6 at TTI #2. The radio terminal UE#6 is a radio terminal 10 (second radio terminal) which is to start communications in the EUL.

In such a case, when the initial transmission rate is assigned to the radio terminal UE#6, the total of the transmission rates assigned to the radio terminals UE#1 to UE#6 (the total of the initial transmission rate and the assigned transmission rate) exceeds the maximum receiving transmission rate.

Accordingly, similar to the first embodiment, the base station 100 selects the reduction target terminal among the radio terminals UE#1 to UE#5 in consideration of "TEBS", "Happy Bit", "Priority Class", "UPH", and others. In other words, the base station 100 transmits transmission rate decrease data (AG or RG) to any one of the radio terminals UE#1 to UE#5 to decrease the assigned transmission rate.

Here, the base station 100 selects the radio terminals UE#2 and UE#4 as reduction target terminals, and, thereafter, transmits the transmission rate decrease data to the radio terminals UE#2 and UE#4.

Note that the transmission rates of the radio terminals UE#1 and UE#5 cannot be controlled for every TTI because the radio terminals UE#1 and UE#5 perform communications in the R99. Accordingly, the radio terminals UE#1 and UE#5 are excluded from candidates for the reduction target terminal. In addition, having the minimum transmission rate, the radio terminal UE#3 may be excluded from a candidate for the reduction target terminal.

As a result, at TTI#3, the total of the transmission rates assigned to the radio terminals UE#1 to UE#6 (the total or the initial transmission rate and the assigned transmission rate) does not exceed the maximum receiving transmission rate even if the in initial transmission rate is assigned to the radio terminal UE#6.

Third Embodiment

A third embodiment will be described below by referring to the drawings. In the following description, differences between the first embodiment and the third embodiment will be mainly described.

In the third embodiment, a base station 100 (cell) selects a reduction target terminal according to the triggers to be described below. Specifically, the base station 100 (cell) selects a reduction target terminal when it is detected that uplink user data received from a radio terminal 10 is discarded.

(Cell Configuration)

Figure 9:
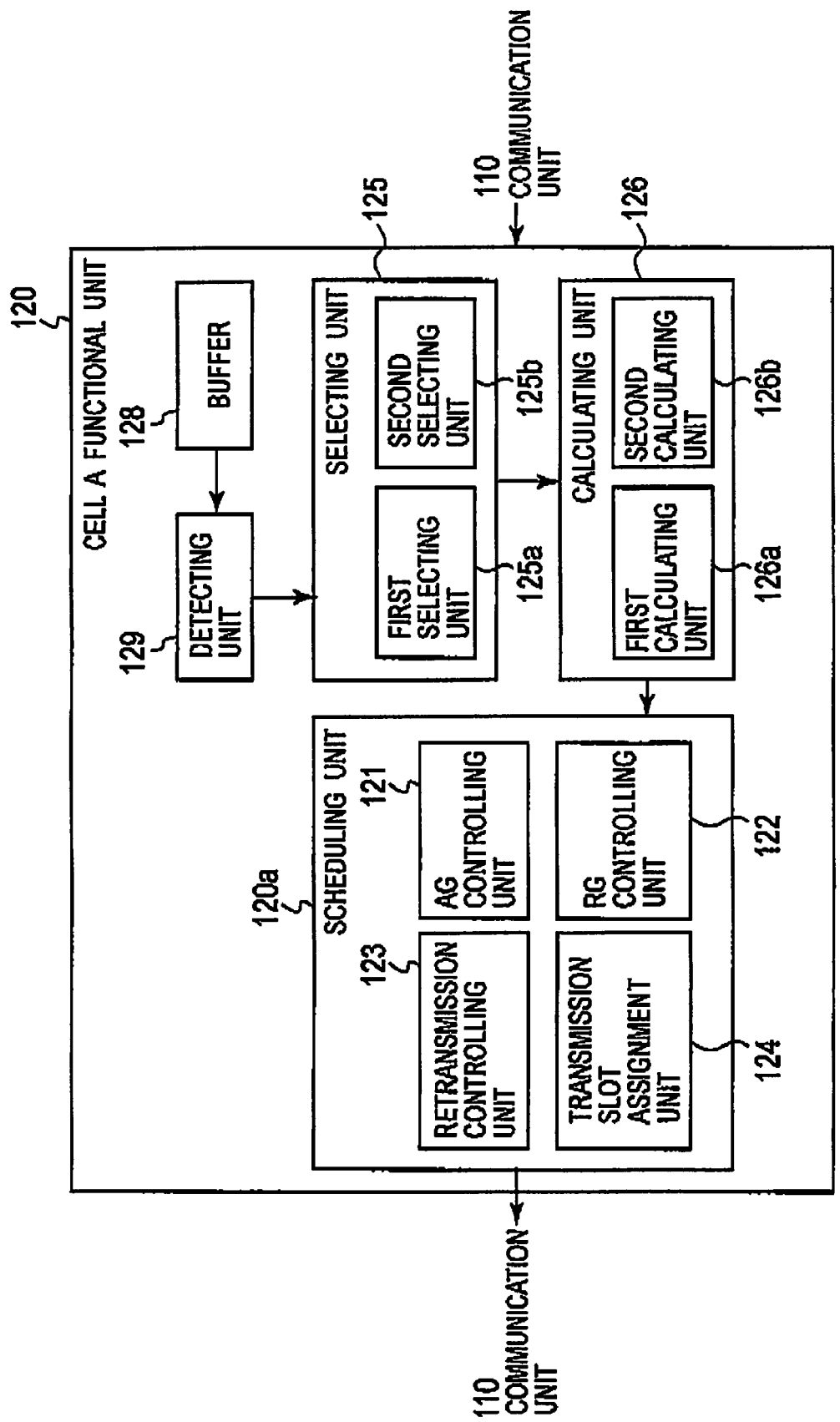
FIG. 9 is a block diagram showing a cell A functional unit 120 according to a third embodiment.

The configuration of a cell according to the third embodiment will be described below by referring to the drawings. FIG. 9 is a block diagram showing the cell (cell A functional unit 120) according to the third embodiment. Here, the case where the cell A functional unit 120 functions as a serving cell will be described as an example. In FIG. 9, similar reference numerals are given to denote components similar to those of FIG. 5.

As shown in FIG. 9, the cell A functional unit 120 includes a buffer 128 and a detecting unit 129 in addition to the configuration shown in FIG. 5.

The buffer 128 accumulates uplink user data (block) received from the radio terminal 10 through the E-DPDCH. A buffer amount threshold which is a data amount of the uplink user data capable of being accumulated in the buffer 128 is determined in advance.

When the uplink user data amount accumulated in the buffer 128 exceeds the buffer amount threshold, the uplink user data (block) received from the radio terminal 10 is discarded. Note that, among the uplink user data (block) accumulated in the buffer 128, the oldest block or the latest block may be discarded. Among the uplink user date (block) accumulated in the buffer 128, the block with the lowest priority may be discarded.

The detecting unit 129 detects the fact that the uplink user data (block) is discarded. Specifically, the detecting unit 129 detects that the uplink user data (block) is discarded by the following two methods.

Firstly, the detecting unit 129 detects that the uplink user data (block) is discarded in the buffer 128. The detecting unit 129 notifies a scheduling unit 120$a$ that the uplink user data (block) is discarded in the buffer 128.

Secondly, the detecting unit 129 detects that the uplink user data is discarded in a wire transmission path set between the base station and a radio network controller 200. Specifically, the detecting unit 129 monitors congestion information received from the radio network controller 200, and detects the discard of the uplink user data in the wire transmission path when receives the congestion information indicating the occurrence of the congestion, the congestion information detected through the discard of the uplink user data. The detecting unit 129 notifies the scheduling unit 120$a$ that the uplink user data (block) is discarded in the wire transmission path.

Here, the wire transmission path may possibly be shared by multiple base stations 100. The radio network controller 200 transmits congestion information indicating whether or not congestion is caused in the wire transmission path (TNL Congestion Indication) to the base station 100 (see, TS25.427 Ver. 7.5.0.5.14 "TNL Congestion Indication").

The congestion information includes (1) information indicating that no congestion is caused ("0 No TNL Congestion"), (2) information indicating that congestion detected by delay is caused "2 TNL Congestion-detected by delay build up", and (3) information indicating that congestion detected by discard of the uplink user data is caused "3 TNL Congestion-detected by frame loss" (see, TS25.427 Ver. 7.5.0 6.3.3.11 "TNL Congestion Indicaton").

Note that, similar to the first embodiment the above-described selecting unit 125 selects the radio terminal 10 (reduction target terminal) whose transmission rate is reduced in consideration of "TEBS", "Happy Bit", "Priority Class", "UPH", and others, in a case where the detecting unit 129 detects that the uplink user data (block) is discarded.

Fourth Embodiment

A fourth embodiment will be described below by referring to the drawings. In the following description, differences between the first embodiment and the fourth embodiment will be mainly described.

In the fourth embodiment, a base station 100 (serving cell) selects a reduction target terminal according to the triggers to be described below. Specifically, the base station 100 (serving cell) selects a reduction target terminal according to an instruction from a non-serving cell. Here, the non-serving cell instructs the serving cell to decrease a transmission rate of uplink user data when received power (interference power) of the uplink user data received from the radio terminal 10 (non-serving terminal) exceeds a predetermined interference threshold.

(Configuration of Cell Functioning as Non-serving Cell)

Figure 10:
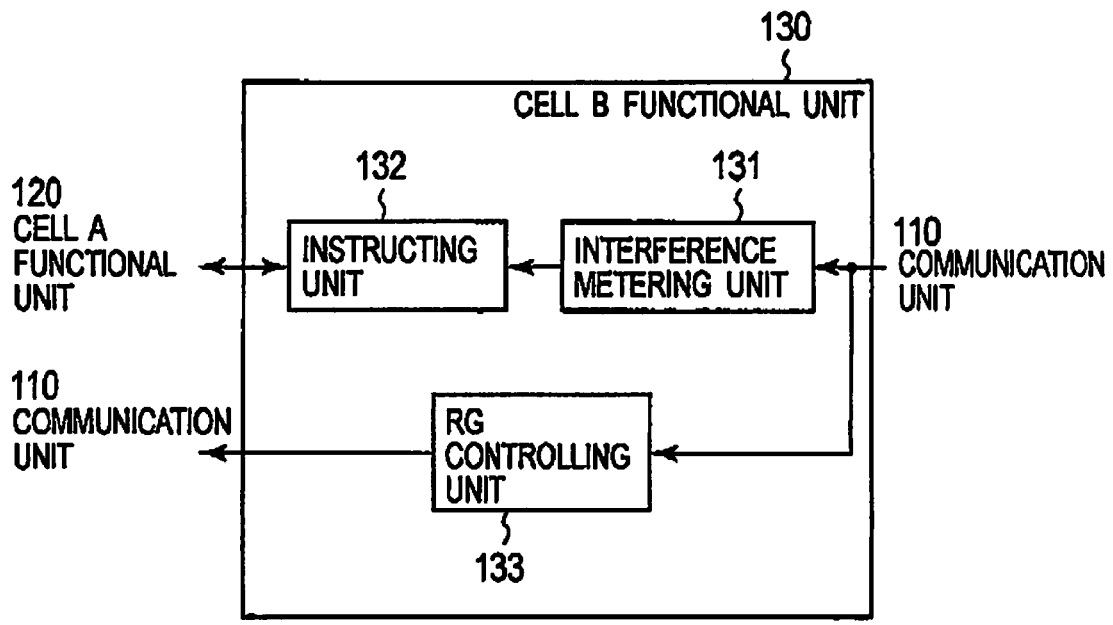
FIG. 10 is a block diagram showing a cell B functional unit 130 according to a fourth embodiment.

The configuration of a cell functioning as a non-serving cell according to the fourth embodiment will be described below by referring to the drawings. FIG. 10 is a block diagram showing a cell B (cell B functional unit 130) functioning as a non-serving cell according to the fourth embodiment. As described above, the cell B functional unit 130 (cell B) functions as a non-serving cell for the radio terminals 10 located in the cells A, C and D (that is, the radio terminal 10 using the cells A, C, and D as a serving cell).

As shown in FIG. 10, the cell B functional unit 130 functioning as a non-serving cell has an interference metering unit 131, an instructing unit 132, and an RG controlling unit 133.

The interference metering unit 131 measures received power of various kinds of data received from the radio terminal 10 (serving terminal) located in the cell B and interference power of various kinds of data received from the radio terminal 10 (non-serving terminal) located in a cell other than the cell B. The cell other than the cell B includes not only the cells A, C, and D but also cells which are included in another base station adjacent to the base station 100.

Figure 11:
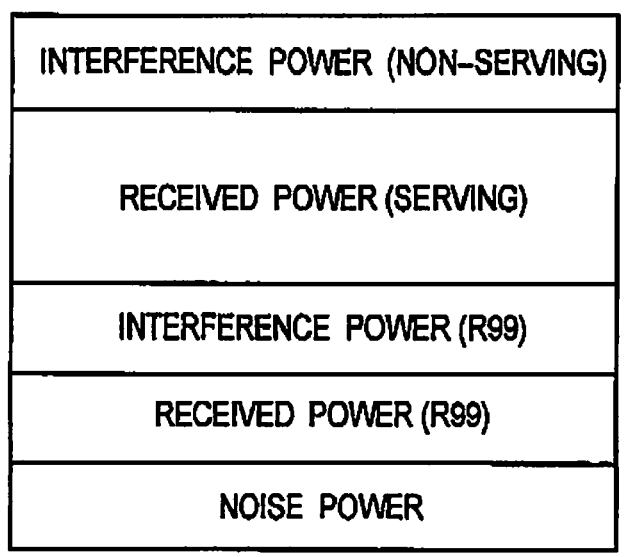
FIG. 11 is a view for illustrating total received power according to the fourth embodiment.

Specifically, as shown in FIG. 11, the interference metering unit 131 measures noise power, received power (R99), interference power (R99), received power (serving), and interference power (non-serving).

The received power (R99) is received power of the uplink user data which the cell B receives, through the DPDCH, from the radio terminal 10 located in the cell B. The interference power (R99) is received power of the uplink user data which the cell B receives, through the DPDCH, from the radio terminal 10 located in the cell other than the cell B.

The received power (serving) is received power of the uplink user data which the cell B receives, through the E-DP-DCH, from the radio terminal 10 (serving terminal) located in cell B. The interference power (non-serving) is received power of the uplink user data which the cell B receives, through the E-DPDCH, from the radio terminal 10 (non-serving terminal) located in the cell other than the cell B.

The instructing unit 132 determines whether or not the interference power (non-serving) exceeds a predetermined interference threshold. The predetermined interference threshold may be a predetermined fixed value or a value determined by a ratio of the received power (serving) to the interference power (non-serving).

For example, a case is considered where the predetermined interference threshold, the interference power (non-serving), and the received power (serving) are respectively expressed by "Th," "I," and "S".

In this case, if the predetermined interference threshold "Th" is a fixed value, the instructing unit 132 determines whether or not "I" exceeds "Th".

If the predetermined interference threshold "Th" is a value determined by "I/S", the instructing unit 132 determines whether or not "I" exceeds "Th×S". On the other hand, if the predetermined interference threshold "Th" is a value determined by "S/I", the instructing unit 132 determines whether or not "I" exceeds "S/Th".

If the predetermined interference threshold "Th" is a value determined by "I/S+I", the instructing unit 132 determines whether or not "I" exceeds "Th×(S+I)". On the other hand, if the predetermined interference threshold "Th" is a value determined by "S+I/I", the instructing unit 132 determines whether or not "I" exceeds "(S+I)/Th".

Subsequently, if the interference power (non-serving) exceeds the predetermined interference threshold, the instructing unit 132 instructs the cell A (cell A functional unit 120) which the radio terminal 10 (non-serving terminal) uses as a serving cell to decrease a transmission rate assigned to the radio terminal 10 (non-serving cell) using the cell B as a non-serving cell.

The RG controlling unit 133 transmits the RG to the radio terminal 10 (non-serving terminal) using the cell B as a non-serving cell through the E-RGCH. The RG is any one of a maintenance command "Hold" or a decrease command "Down". As described above, the decrease command "Down" is a command instructing a decrease of the transmission rate by a predetermined decrease range. Note that the RG controlling unit 133 does not transmit an increase command "Up" to a non-serving terminal.

Note that, similar to the first embodiment, according to the instruction from the cell B functional unit 130 (non-serving cell), the above-described cell A functional unit 120 (selecting unit 125) selects, among the multiple radio terminals 10, each using the cell A as a serving cell, the radio terminal 10 (reduction target terminal) whose transmission rate is decreased in consideration of "TEBS", "Happy Bit", "Priority Class", "UPH", and others.

Fifth Embodiment

A fifth embodiment will be described below by referring to the drawings. In the following description, differences between the first embodiment and the fifth embodiment will be mainly described.

In the fifth embodiment a base station 100 (serving cell) selects a reduction target terminal according to the triggers to be described below. Specifically, the base station 100 (serving cell) selects a reduction target terminal in a transmission time interval (decrease target transmission time interval) in which the total of transmission rates the base station can assign exceeds an allowable receiving transmission rate.

(Cell Configuration)

Figure 12:
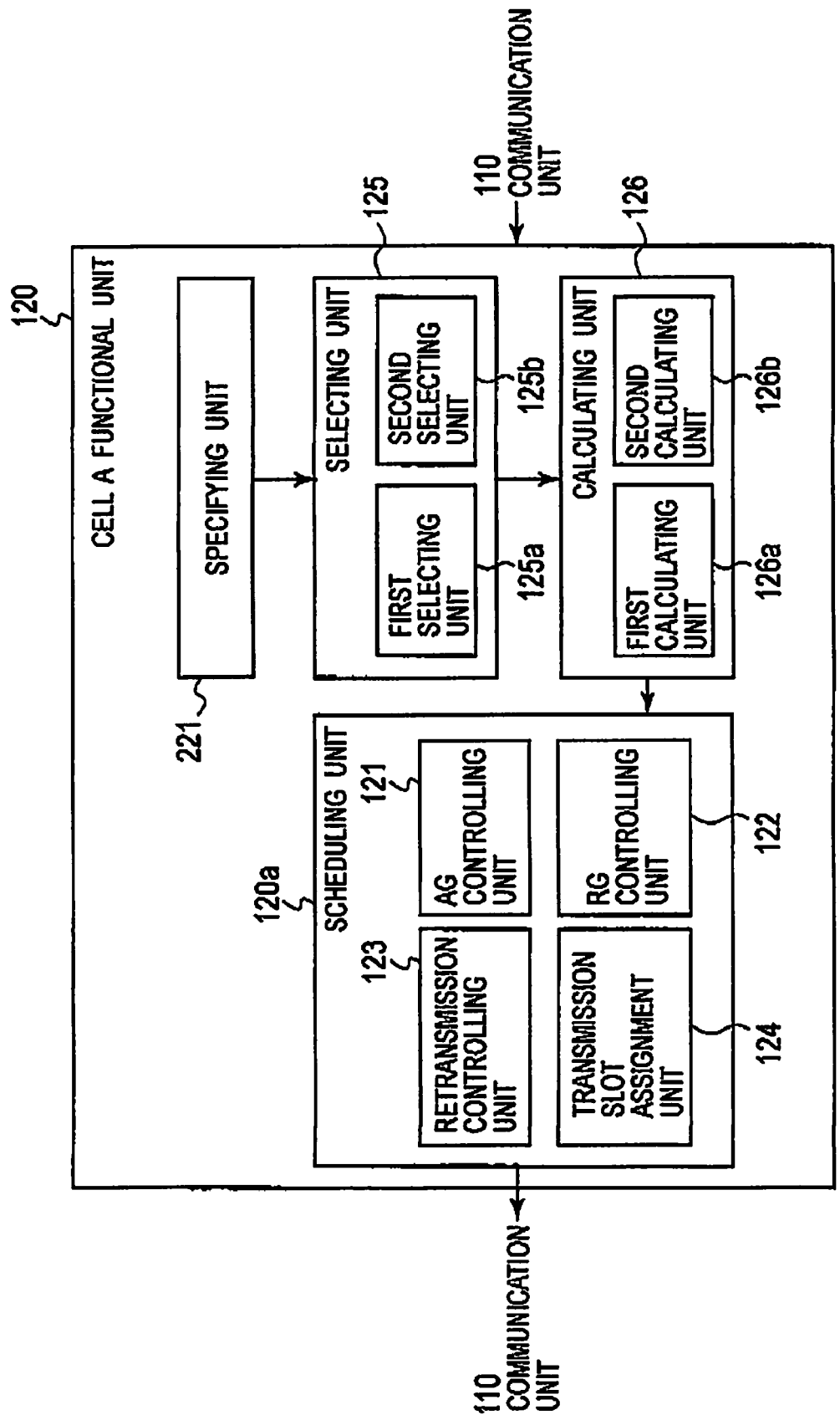
FIG. 12 is a block diagram showing a cell A functional unit 120 according to a fifth embodiment.

The configuration of a cell according to the fifth embodiment will be described below by referring to the drawings. FIG. 12 is a block diagram showing a cell (cell A functional unit 120) according to the fifth embodiment. Here, the case where the cell A functional unit 120 functions as a serving cell will be described as an example. In FIG. 12, similar reference numerals are given to denote components similar to those of FIG. 5.

As shown in FIG. 12, the cell A functional unit 120 includes a specifying unit 221 in addition to the configuration shown in FIG. 5.

The specifying unit 221 specifies a decrease target time interval (decrease target TTI) being a transmission time interval (TTI) in which the total of assigned transmission rates exceeds an allowable receiving transmission rate.

The assigned transmission rate includes a transmission rate which is assigned to the radio terminal 10 performing communications in the R99 and a transmission rate which is assigned to the radio terminal 10 performing communications in the EUL.

The allowable receiving transmission rate is a transmission rate which is equal to or lower than the maximum receiving transmission rate. Note that the allowable receiving transmission rate may be fixed in advance or may be changed depending on a status of using a radio resource. The maximum receiving transmission rate is an upper limit of the transmission rate that the base station 100 (here, the cell A) can assign to the radio terminal 10. The maximum receiving transmission rate may be considered as an upper limit of the radio resource (maximum radio resource) assignable to the radio terminal 10.

Note that a difference between the maximum receiving transmission rate and the allowable receiving transmission rate is a margin (reserved resource) of the transmission rate (radio resource) that the base station 100 (cell) can assign.

(One Example of Transmission Rate Control)

One example of transmission rate control according to the fifth embodiment will be described below. FIG. 13 is a view showing one example of transmission rate control according to the fifth embodiment.

As shown in FIG. 13, multiple TTIs (TTI#1 to TTI#8) constitute one cycle. In transmission of uplink user data, this cycle is repeated.

In TTI#1, TTI#6, and TTI#7, each of the totals of the assigned transmission rates exceeds the allowable receiving transmission rate. In other words. TTI#1, TTI#6, and TTI#7 are decrease target TTIs.

The assigned transmission rate includes a transmission rate (R99) assigned in the R99 and a transmission rate (EUL) assigned in the EUL. Note that the transmission rate (R99) does not have to be assigned. The transmission rate (EUL) assigned in the EUL includes a transmission rate assigned for scheduled transmission (EUL (Scheduled)) and a transmission rate assigned for non-scheduled transmission (EUL (Non-scheduled)). Note that the transmission rate (EUL (Non-scheduled)) does not have to be assigned.

The scheduled transmission is a transmission mode in which the radio terminal 10 transmits uplink user data using an active process assigned by the base station 100. The non-scheduled transmission is a transmission mode in which the radio terminal 10 transmits uplink user data without depending on scheduling control of the base station 100.

Here, the transmission rate (EUL) assigned in the EUL includes a transmission rate assigned to a reduction target terminal (EUL (reduction target UE)). Note that the transmission rate (EUL (reduction target UE)) is inherently included in the transmission rate (EUL (Scheduled)). In other words, in FIG. 13, for simplifying the description, the transmission rate (EUL (reduction target UE)) and the transmission rate (EUL (Scheduled)) are only described separately.

In such a situation, the selecting unit 125 selects the radio terminal 10 (decrease target terminal) whose transmission rate is decreased in the decrease target time intervals (decrease target TTIs), that is, in TTI#1, TTI#6, and TTI#7.

Sixth Embodiment

A sixth embodiment will be described below. In the following description, differences between the first embodiment and the sixth embodiment will be mainly described.

In the sixth embodiment, a base station 100 (serving cell) selects a reduction target terminal according to the triggers to be described below. Specifically, the base station 100 (serving cell) selects a reduction target terminal when a difference between total received power (RTWP: Received Total Wideband Power) in a bandwidth used for reception from the radio terminal 10 and target received power (Target RTWP) targeted in the bandwidth falls within a predetermined range.

Here, the target received power (Target RTWP) is equal to or lower than the maximum received power (Maximum RTWP) which is allowed for the serving cell within the bandwidth. The maximum received power is determined by a radio network controller 200 in consideration of interference to another cell. The radio network controller 200 notifies the base station 100 (serving cell) of the maximum received power (see, 3GPP TS25.309 Ver. 6.6.0 14.1 "Scheduler Control from CRNC to Node B).

Other Embodiments

The present invention has been described by the above-described embodiments. However, it should not be understood that the description and drawings which constitute one part of this disclosure limit the invention. From this disclosure, various alternative embodiments, examples, operational techniques will be apparent to a person skilled in the art.

In the above-described embodiments, the radio terminal 10 to be selected as a reduction target terminal includes (1) the radio terminal 10 in which an buffer amount of the transmission buffer 13 is smaller than a predetermined threshold, (2) the radio terminal 10 in which a happiness rate is higher than a predetermined threshold, (3) the radio terminal 10 in which a transmission power ratio shown by "UPH" is smaller than a predetermined threshold, (4) the radio terminal 10 which transmits the uplink user data at a transmission rate lower than the assigned transmission rate, (5) the radio terminal 10 to which AG (Inactive) cannot be transmitted, and others. Here, the base station 100 may calculate a weighted value in which a part or all of these criteria are weighted and select the radio terminal 10 to be a reduction target terminal according to the total of the calculated weighted values.

The above-described first to sixth embodiments may be used in combination when needed.

What is claimed is:

1. A radio communication system in which a radio terminal transmits uplink user data to a base station through an enhanced dedicated physical data channel and the base station transmits, to the radio terminal, transmission rate control data for controlling a transmission rate of the uplink user data, wherein the base station includes:
   a first selecting unit configured to select as a reduction target terminal the radio terminal of which an assigned transmission rate is to be reduced, where the assigned transmission rate is the transmission rate that the base station has already assigned to the radio terminal;
   a first calculating unit configured to calculate a reduction amount of the assigned transmission rate assigned to the reduction target terminal selected by the first selecting unit;
   a second selecting unit configured to select as an increase target terminal the radio terminal of which the assigned transmission rate is to be increased;
   a second calculating unit configured to calculate an increase amount of the assigned transmission rate assigned to the increase target terminal selected by the second selecting unit; and
   a transmitting unit configured to transmit, to the reduction target terminal, the transmission rate control data indicating the transmission rate after the assigned transmission rate is reduced by the reduction amount, and that transmit, to the increase target terminal, the transmission rate control data indicating the transmission rate after the assigned transmission rate is increased by the increase amount,
   the second selecting unit selects the increase target terminal when the reduction target terminal is not selected by the first selecting unit,
   the second calculating unit calculates the increase amount not to exceed an allowable receiving transmission rate, when the reduction target terminal is not selected by the first selecting unit, and
   the allowable receiving transmission rate is equal to or lower than a maximum receiving transmission rate assignable by the base station.

2. The radio communication system according to claim 1, wherein
   the radio terminal includes a terminal side transmitting unit configured to transmit information indicating a buffer amount to the base station, where the buffer amount is an uplink user data amount accumulated in a transmission buffer provided in the radio terminal, and
   the first selecting unit selects as the reduction target terminal the radio terminal of which the buffer amount is smaller than a predetermined threshold.

3. The radio communication system according to claim 1, wherein
   the radio terminal includes a terminal side transmitting unit configured to transmit happiness information to the base station, the happiness information indicating whether or not the transmission rate assigned to the radio terminal is sufficient, and
   the first selecting unit selects as the reduction target terminal, the radio thermal that transmits the happiness information indicating the assigned transmission rate is sufficient, with a ratio higher than a predetermined threshold.

4. The radio communication system according to claim 1, wherein
   the transmission rate is determined by a transmission power ratio of the enhanced dedicated physical data channel to transmission power of a dedicated physical control channel,
   the radio terminal includes a terminal side transmitting unit configured to transmit information indicating the transmission power ratio to the base station, where the transmission power ratio is a ratio of maximum transmission power allowed to the radio terminal to the transmission power of the dedicated physical control channel, and
   the first selecting unit selects as the reduction target terminal the radio terminal of which the transmission power ratio is smaller than a predetermined threshold.

5. The radio communication system according to claim 1, wherein
   the first selecting unit selects as the reduction target terminal the radio terminal that transmits the uplink user data at the transmission rate lower then the assigned transmission rate.

6. The radio communication system according to claim 1, wherein
   the radio terminal transmits the uplink user data to the base station at a transmission time interval assigned to the ratio terminal,
   the transmitting unit transmits a stop request to the radio terminal, the stop request requesting stop of using the transmission time interval assigned to the radio terminal, and
   the first selecting unit selects as the reduction target terminal the radio terminal to which the transmitting unit fails to send the stop request.

7. The radio communication system according to claim 1, wherein
   the base station includes a determination unit configured to determine whether or not a total of an initial transmission rate and the assigned transmission rate exceeds the allowable receiving transmission rate when receiving a communication start request from a second radio terminal which starts a new communication, where the initial transmission rate is the transmission rate initially assigned to the second radio terminal, and
   the first selecting unit selects the reduction target terminal when the total of the initial transmission rate and the assigned transmission rate exceeds the allowable receiving transmission rate.

8. The radio communication system according to claim 1, wherein
the base station includes a detecting unit configured to detect a discard of the uplink user data received from the radio terminal, and
the first selecting unit selects the reduction target terminal when the detecting unit detects the discard of the uplink user data.

9. The radio communication system according to claim 1, comprising:
a serving cell configured to transmit, to the radio terminal as the transmission rate control data, absolute transmission rate control data for directly indicating the transmission rate of the uplink user data and relative transmission rate control data for relatively indicating the transmission rate of the uplink user data; and
a non-serving cell configured to transmit the relative transmission rate control data to the radio terminal without transmitting the absolute transmission rate control data, wherein
the serving cell includes the first selecting unit, the first calculating unit, the second selecting unit, the second calculating unit, and the transmitting unit,
the non-serving cell includes an instructing unit configured to instruct the serving cell to decrease the transmission rate of the uplink user data when received power of the uplink user data received from the radio terminal exceeds a predetermined interference threshold, and
the first selecting unit selects the reduction target terminal according to an instruction of the instructing unit.

10. The radio communication system according to claim 1, wherein
the radio terminal transmits the uplink user data to the base station at a transmission time interval assigned to the radio terminal,
the base station includes a specifying unit configured to specify a decrease target transmission time interval being the transmission time interval in which a total of transmission rates assignable by the base station exceeds the allowable receiving transmission rate, and
the first selecting unit selects the reduction target terminal at the decrease target transmission time interval.

11. The radio communication system according to claim 1, wherein
the first selecting unit selects the reduction target terminal when a difference between total received power in a bandwidth used for reception from the radio terminal and target received power targeted in the bandwidth falls within a predetermined range.

12. A radio communication method in which a radio terminal transmits uplink user data to a base station through an enhanced dedicated physical data channel and the base station transmits transmission rate control data for controlling a transmission rate of the uplink user data to the radio terminal, the radio communication method comprising:
(A) causing the base station to select as a reduction target terminal the radio terminal of which an assigned transmission rate is to be reduced, where the assigned transmission rate is the transmission rate that the base station have already assigned to the radio terminal;
(B) causing the base station to calculate a reduction amount of the assigned transmission rate assigned to the reduction target terminal selected in the (A);
(C) causing the base station to select as an increase target terminal the radio terminal of which the assigned transmission rate is to be increased;
(D) causing the base station to calculate an increase amount of the assigned transmission rate assigned to the increase target terminal selected in the (C); and
(E) causing the base station to transmit, to the reduction target terminal, the transmission rate control data indicating the transmission rate after the assigned transmission rate is reduced by the reduction amount and to transmit, to the increase target terminal, the transmission rate control data indicating the transmission rate after the assigned transmission rate is increased by the increase amount, wherein
in the (C), the increase target terminal is selected when the reduction target terminal is not selected in the (A),
in the (D), the increase amount is calculated not to exceed an allowable receiving transmission rate, when the reduction target terminal is not selected in (A), and
the allowable receiving transmission rate is equal to or lower than a maximum receiving transmission rate assignable by the base station.

13. A base station which receives uplink user data from a radio terminal though an enhanced dedicated physical data channel and transmits transmission rate control data for controlling a transmission rate of the uplink user data to the radio terminal, the base station comprising:
a first selecting unit configured to select as a reduction target terminal the radio terminal of which an assigned transmission rate is to be reduced, where the assigned transmission rate is the transmission rate that the base station have already assigned to the radio terminal;
a first calculating unit configured to calculate a reduction amount of the assigned transmission rate assigned to the reduction target terminal selected by the first selecting unit;
a second selecting unit configured to select as an increase target terminal the radio terminal of which the assigned transmission rate is to be increased;
a second calculating unit configured to calculate an increase amount of the assigned transmission rate assigned to the increase target terminal selected by the second selecting unit and
a transmitting unit configured to transmit, to the reduction target terminal, the transmission rate control data indicating the transmission rate after the assigned transmission rate is reduced by the reduction amount and to transmit, to the increase target terminal, the transmission rate control data indicating the transmission rate after the assigned transmission rate is increased by the increase amount, wherein
the second selecting unit selects the increase target terminal when the reduction target terminal is not selected by the first selecting unit,
the second calculating unit calculates the increase amount not to exceed an allowable receiving transmission rate, when the reduction target terminal is not selected by the first selecting unit, and
the allowable receiving transmission rate is equal to or lower than a maximum receiving transmission rate assignable by the base station.

* * * * *

UNITED STATES PATENT AND TRADEMARK OFFICE
CERTIFICATE OF CORRECTION

PATENT NO. : 7,801,550 B2  Page 1 of 1
APPLICATION NO. : 12/365188
DATED : September 21, 2010
INVENTOR(S) : Takahiro Hayashi et al.

It is certified that error appears in the above-identified patent and that said Letters Patent is hereby corrected as shown below:

On the title page item (54) and col. 1, line 1, should read:

RADIO COMMUNICATION SYSTEM AND METHOD WHERE A RADIO TERMINAL TRANSMITS UPLINK USER DATA TO A BASE STATION THROUGH AN ENHANCED DEDICATED PHYSICAL DATA CHANNEL

Signed and Sealed this

Thirtieth Day of November, 2010

David J. Kappos
*Director of the United States Patent and Trademark Office*